(12) United States Patent
Costa Requena

(10) Patent No.: US 7,441,032 B2
(45) Date of Patent: Oct. 21, 2008

(54) SYSTEM AND METHODS FOR USING AN APPLICATION LAYER CONTROL PROTOCOL TRANSPORTING SPATIAL LOCATION INFORMATION PERTAINING TO DEVICES CONNECTED TO WIRED AND WIRELESS INTERNET PROTOCOL NETWORKS

(75) Inventor: Jose Costa Requena, Helsinki (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 11/654,701

(22) Filed: Jan. 17, 2007

(65) Prior Publication Data

US 2007/0124472 A1     May 31, 2007

Related U.S. Application Data

(62) Division of application No. 10/023,456, filed on Oct. 30, 2001.

(60) Provisional application No. 60/246,779, filed on Nov. 8, 2000.

(51) Int. Cl.
*G06F 15/173* (2006.01)

(52) U.S. Cl. .................. 709/225; 709/204; 709/205; 709/206; 709/223; 709/224; 455/456.1; 455/456.2; 455/456.3; 455/457

(58) Field of Classification Search ......... 709/204–207, 709/223, 224, 225, 230; 455/456.1, 456.2, 455/456.3, 457
See application file for complete search history.

(56) References Cited

U.S. PATENT DOCUMENTS

| 5,790,649 | A | 8/1998 | Hiroshige | 379/93.24 |
|---|---|---|---|---|
| 6,301,609 | B1 | 10/2001 | Aravamudan et al. | 709/207 |
| 6,463,471 | B1 | 10/2002 | Dreke et al. | 709/224 |
| 6,807,423 | B1 | 10/2004 | Armstrong et al. | 455/440 |
| 2002/0062345 | A1 | 5/2002 | Guedalia et al. | 709/204 |
| 2002/0065894 | A1 | 5/2002 | Dalal et al. | 709/206 |

OTHER PUBLICATIONS

CAMP: A context-Aware Mobile Portal, by Davide Mandato, Erno Kovacs, Fritz Hohl, Hamid Amir-Alikhami, IEEE, 2000.*
RFC 2543, NWG, "SIP: Session Initiation Protocol" Handley et al., Mar. 1999.
"SIP Extensions for Presence", IEFT Internet Draft, Rosenberg et al, Jun. 15, 2000.
"SIP Extensions for Instant Messaging", IETF Internet Draft, Rosenberg et al, Jun. 15, 2000.
SIP Extensions for Message Waiting Indication, IETF Internet Draft, Mahy et al, Jul. 2000.
"Basic SLoP Architecture Proposal", IETF Internet Draft, J. Loughney et al, Jul. 15, 2000.

(Continued)

*Primary Examiner*—Nathan Flynn
*Assistant Examiner*—Mohammad Siddiqi
(74) *Attorney, Agent, or Firm*—Ware, Freesola, Van Der Sluys & Adolpson LLP

(57) ABSTRACT

Application layer signaling is provided from users registering at a presence server for a presence service wherein upon reception the signaling is checked for spatial location information and stored for future use in providing the presence service in association with other user information, such as user identity. The application layer signaling may be in accordance with the session initiation protocol (SIP) and the spatial location information provided as a spatial location payload (SLoP). The presence service may provide access to the spatial location information to one or more location based services either openly or confidentially by hiding the user's identity and other information. The spatial location information may also be used in conjunction with a messaging service for providing messages to the users with enhanced functionality.

13 Claims, 17 Drawing Sheets

OTHER PUBLICATIONS

The Finger User Information Protocol, RFC 1288, NWG, D. Zimmerman, Dec. 1991.

RFC 2167, NWG, "Referral Whois (RWhois) Protocol V1.5", S. Williamson et al, Jun. 1997.

"Lightweight Directory Access Protocol", W. Yeong et al, RFC 1777, NWG, Mar. 1995.

48th IETF Meeting—Spatial Location BoF, Jul. 31, 2000, individual presentations.

"Evaluation of Multicast Routing Algorithms for Real-Time Communication on High-Speed Networks", H. Salama et al, IEEE Journal on Selected Areas in Communications, vol. 15, No. 3, Apr. 1997.

"Geography Markup Language (GML), v1.0", May 12, 2000, OGC Document No. 00-029.

"Target Naming Scheme", H. Tang et al, IETF Internet Draft, Jul. 11, 2000.

"Some Scenarios for an ISL Architecture", M. Korkea-aho, IETF Internet Draft, Mar. 10, 2000.

"Spatial Location Protocol Location Server Authentication", J. Polk et al, IETF Internet Draft, Mar. 10, 2000.

RFC 2617, NWG, Jun. 1999, "HTTP Authentication: Basic and Digest Access Authentication", J. Franks et al.

RFC 2440, NWG, Nov. 1998, "Open PGP Message Format", J. Callas et al.

"ISL Architectural Considerations", S. Nyckelgard et al. IETF Mar. 8, 2000.

"Server Cache Synchronization Protocol (SCSP)", J. Luciani et al, RFC 2334, NWG, Apr. 1998.

"An XML Format for Presence Buddy Lists", J. Rosenberg et al, IETF Internet Draft, Jun. 15, 2000.

"Basic SLoP Architecture Proposal", J. Loughney et al, IETF Internet Draft, Jul. 15, 2000.

"Extending Your Markup: An XML Tutorial", A. Bergholz, IEEE Internet Computing, Jul.-Aug. 2000, pp. 74-79.

"A Means for Expressing Location Information in the Domain Name System", C. Davis et al, RFC 1876, NWG, Jan. 1996.

"Integrating Presence with Multi-Media Communications", R. Bennett et al, DynamicSoft White Paper, 2000.

"Consideration on IP Spatial Location Protocol Requirements", M. Ylianttila et al, IETF Draft, Apr. 11, 2000.

"Spatial Location Protocol Requirements", B. Rosen et al, IETF Draft, Jul. 2000.

"A Simple Text Format for the Spatial Location Protocol (SLoP)", R. Mahy, IETF Draft, Jul. 2000.

"Problems and Requirements of Some IP Applications Based on Spatial Location Information", H. Tang et al, IETF Draft, Feb. 14, 2000.

"Target Naming Scheme", H. Tang et al, IETF Internet Draft, Jul. 12, 2000.

"A Common Spatial Location Dataset", M. Korkea-aho et al, IETF Internet Draft, Nov. 2000.

"Spatial Location Payload Requirements with Protocol Recommendations", H. Tang et al, IETF Internet Draft, Nov. 2000.

"Charter for the Would -Be BOF (v00)", ed. H. Tang, Jan. 26, 2000.

"A Proposal for the Version-01 BOF Charter", ed. H. Tang, Feb. 21, 2000.

"Spatial Location BOF (spatial)", H. Tang et al, Mar. 30, 2000, Adelaide, with individual and invited presentations.

"The Session Initiation Protocol: Internet-Centric Signaling", H. Schulzrinne et al, IEEE Communications Magazine, Oct. 2000, pp. 134-141.

"Spatial Location Protocol Requirements", Internet Draft, B. Rosen et al, Jul. 31, 2000, pp. 1-4.

\* cited by examiner

FIG. 2

REGISTER sip: Request-URI SIP/2.0
Via: SIP/2.0/UDP IP address
From: sip: public address [user@domain]
[E.164 address@CSCFdomain; user=phone]
To: sip: public address [user@domain]
[E.164 address@CSCFdomain; user=phone]
Call-ID: local-ID@host
CSeq: 1 REGISTER
Contact: <sip:user@IP address:port; transport=udp/tcp>
Authorization: UMTS <RES value in HEX format>
Content-Length:X
Expires: delta-seconds
Content-type: presence/TID <urn:namespace-xyz:car=abc-888,
registration-state=nnn,owner=mike.lee,
nationality=xyz,id=221161-3355,
email=mike.lee@hardcom.com,
pstn=+358405021988......>

FIG. 3

REGISTER sip: i-cscsf.nokia.com SIP/2.0
Via: SIP/2.0/UDP I-cscf.nokia.com
From: sip: Road_user@CSCFdomain; user=phone
To: sip: Road_user @CSCFdomain; user=phone
Call-ID: my_host@host
CSeq: 1 REGISTER
Contact: <sip:joe@nokia.com:5060; transport=udp>
Authorization: UMTS <RES value in HEX format>
Content-Length:X
Expires: delta-seconds
Content-type: application/TID
&
*****************************************************
ENCRYPTED
urn:namespace-xyz:car=abc-888,registration-
state=nnn, owner=mike.lee,
nationality=xyz,id=221161-3355,
email=mike.lee@hardcom.com,
pstn=+358405021988
*****************************************************

```
INVITE sip: i-cscsf.nokia.com SIP/2.0
Via: SIP/2.0/UDP i-cscf.nokia.com
From: sip: Road_user@CSCFdomain; user=phone
To: sip: Road_user @CSCFdomain; user=phone
Call-ID: my_host@host
CSeq: 1 INVITE
Contact: <sip:joe@nokia.com:5060; transport=udp>
Authorization: UMTS <RES value in HEX format>
Content-Length:X
Expires: delta-seconds
Content-type: service-request/NML < Here is defined a XML script defining the type of
service requested in this session following a Nokia
based XML DTD>
```

FIG. 4

| Datum | - WGS84 | (Mandatory) |
|---|---|---|
| Coordinates | - Latitude | (Mandatory) |
| | - Longitude | (Mandatory) |
| | - Altitude above WGS84 reference ellipsoid | (Optional) |
| | - Altitude above mean sea level | (Optional) |
| Location Accuracy | - Horizontal accuracy, by radius of a circle from the positioned point | (Optional) |
| | - Altitude accuracy, by range from the positioned point | (Optional) |
| Time | - Real time of the measurement/fix | (Mandatory) |
| Speed | - Ground speed | (Optional) |
| | - Vertical speed | (Optional) |
| Direction | - Direction of movement | (Optional) |
| Course | - Direction from the current position to a defined destination | (Optional) |
| Orientation | - Horizontal orientation | (Optional) |
| | – Vertical orientation (pitch) | |
| Un-specified Attributes | - Attributes enabling some extensibility | (Optional) |

```
<SL-info>
  <Header>
    <TID>
      urn:username@company.com, owner=jose,id=2342112,
      email=jose.Costa-Requena@nokia.com, pstn=+358405201815
    </TID>
    <Security: 10/>
    <Transparency: 0/>
    <Signature: aZWQAd22aFg&"£4/>
    <Time-to-Live: 3000 sec>
  </Header>
  <Body>
    <Location-description>
      I am sitting in a terrace at second floor of Eiffel Tower
    </Location-description>
    <Accuracy: 5m/>
    <Device-Type: mobile/>
    <Device-Status: moving/>
    <Device-Staticy: 7/>
    <Coordinates-calculation: Enabled/>
    <Coordinates-coding: SGML/>
    </Coordinates-data>
      Here comes a SGML script indicating geographical coordinates x,y,z
    <Coordinates-data>
  </Body>
</SL-info>
```

SYSTEM AND METHODS FOR USING AN APPLICATION LAYER CONTROL PROTOCOL TRANSPORTING SPATIAL LOCATION INFORMATION PERTAINING TO DEVICES CONNECTED TO WIRED AND WIRELESS INTERNET PROTOCOL NETWORKS

CROSS-REFERENCE TO RELATED APPLICATIONS

This application is a divisional of U.S. patent application Ser. No. 10/023,456, filed on Oct. 30, 2001, which claims priority under 35 U.S.C. §119 from U.S. Provisional Patent Application No. 60/246,779, filed on Nov. 8, 2000. The aforementioned patent applications are hereby incorporated by reference in their entirety.

TECHNICAL FIELD

This invention relates to telecommunications and, more particularly, to instant messaging and presence.

The invention can also be related to the new UMTS (Universal Mobile Telecommunications System) based on application layer signaling. The invention shows a solution for implementing Instant Messaging and likewise a Presence Service over an application layer control protocol. It utilizes a new location information format defined to communicate the spatial location of the user called "Spatial Location Payload". It provides means and methods for informing network entities about user location information.

BACKGROUND OF THE INVENTION

Presence is a concept promoted in various Internet Engineering Task Force (IETF) documents as the subscription to and notification of changes in a communications state of a user. The state may for instance consist of the set of communications means, communications address, and status of that user. A presence protocol provides such a service over an IP network. An extension to the Session Initiation Protocol (SIP) has been proposed by J. Rosenberg et al for control of presence in the IMPP WG entitled "SIP Extensions for Presence" and which can be found at draft-rosenberg-impp-presence-00.txt, Jun. 15, 2000. The SIP is from the SIP WG and is described at RFC 2543 by Handley et al, entitled "SIP: Session Initiation Protocol" Aug. 6, 2000 found at draft-ietf-sip-rfc2543bis-01.ps. It is an application layer control (signaling) protocol for creating, modifying and terminating sessions with one or more participants.

Instant messaging is widely used today but mostly using a proprietary system to exchange content between a set of participants in real time. Unfortunately, the user of such a proprietary system is tightly bound to the provider and cannot use the service for purposes other than offered by the provider, much less inter-operate with other instant messaging services. In effect, the presence of the user is tightly bound to the proprietary system, and the user cannot get out of this straight jacket. This is a problem. SIP extensions have also been proposed for instant messaging ("SIP extension for Instant Messaging") at draft-rosenberg-impp-im-00.txt, Jun. 15, 2000, also by J. Rosenberg et al of the IMPP WG of the IETF. In that document, motivations are provided on why SIP is an ideal platform for instant messaging (IM), why IM should be completely separated from presence, and how to perform IM with SIP. SIP extensions for message waiting indication have likewise been proposed in the IETF draft-mahy-sip-message-waiting-00.txt, July 2000.

At the IETF it is therefore proposed to use the SIP for registering the user and to use the same mechanism to notify the user about message waiting.

A "Basic SloP Architecture Proposal" by J. Loughney et al, Jul. 15, 2000, IETF draft-loughney-spatial-arch-00.txt proposes a simple architecture supporting the transport of spatial location information to allow services based on spatial location information to inter-operate. The exchange of location information is attractive for exchange of information between devices in both wired and wireless networks.

A problem is therefore how to implement presence and messaging for wired and wireless IP Networks.

DISCLOSURE OF THE INVENTION

An object of the present invention is to provide a way to transport spatial location information pertaining to devices connected to wired and wireless networks.

Another object of the present invention is to provide a solution for implementing instant messaging and presence using an application layer control signaling.

Another object is to apply such solutions to mobile telecommunications systems.

According to a first aspect of the invention, a method for providing a presence service over an internet protocol network comprises the steps of receiving application layer signaling from users registering for said presence service, checking said signaling for spatial location information, and storing said spatial location information for use in providing said presence service.

Further according to the first aspect of the invention, said application layer signaling is according to a session initiation protocol.

Further still according to the first aspect of the invention, said spatial location information is received as a spatial location payload.

Further in accordance with the first aspect of the invention, the step of providing provides access to said spatial location information to one or more location based services.

Further still in accordance with the first aspect of the invention, said access to said spatial location information is provided to said one or more location based services without providing access to associated user identity information.

Yet further in accordance with the first aspect of the invention, the method further comprises the step of using said spatial location information in conjunction with a messaging service for providing messages to said users.

According to a second aspect of the invention, a method for using a presence service over an internet protocol (IP) network comprises the steps of providing application layer signaling from a user registering spatial location information relating to said user for use by said presence server in providing presence services, wherein said user provides or receives a message relating to use of said spatial location information by said presence service using said application layer signaling.

Further according to the second aspect of the invention said application layer signaling is according to a session initiation protocol.

Yet further according to the second aspect of the invention, said spatial location information is received as a spatial location payload.

Yet further still according to the second aspect of the invention, said step of providing or receiving a message relates to use of said spatial location information by said presence server in conjunction with a location based service.

In further accordance with the second aspect of the invention, the step of utilizing a location based service in conjunction with said step of providing or receiving said message.

Further still in accordance with the second aspect of the invention, said step of providing application layer signaling includes the step of providing security for said spatial location information by encryption.

Yet further in accordance with the second aspect of the invention, said step of providing application layer signaling includes the step of providing security for said spatial location information by including security information for use by said presence service in handling said spatial location information.

Yet further still in accordance with the second aspect of the invention, the method further comprises the step of using said spatial location information in conjunction with a messaging service for said providing or receiving said message.

According to a third aspect of the invention, a system comprises a central server, responsive to an invitation message from an inviting user to exchange content with an invited user, for providing a presence query, and a presence server, responsive to said presence query, for providing presence information relating to a registered user, wherein said central server is responsive to said presence information relating to said invited user registered at said presence server, for use in deciding said content should be sent to said invited user, stored or refused, wherein said presence query and invitation message are communicated according to an application layer control protocol and wherein said information relating to presence pertains to a spatial location of said user.

Further according to the third aspect of the invention, said central server is also responsive to said invitation message for providing a subscription query and wherein said system further comprises a messaging server, responsive to said subscription query, for providing notification information relating to a request from a subscribed user for notification of an event, and wherein said central server is responsive to said notification information for said use in deciding said content should be sent to said invited user, stored or refused.

Yet further according to the third aspect of the invention, said application control protocol is a session initiation protocol (SIP).

Further still according to the third aspect of the invention, said information relating to presence and pertaining to said spatial location of said user is communicated as a spatial location payload.

According to a fourth aspect of the invention, a method comprises the steps of registering a first plurality of users to a presence service in response to a corresponding plurality of register requests from the first plurality of users, wherein said register requests include information relating to a corresponding communications state of each of said first plurality of users, subscribing a second plurality of users to an instant messaging service in response to a corresponding plurality of subscribe requests from said second plurality of users, wherein said subscribe requests include information relating to a corresponding request for notification of an event or set of events and wherein said first plurality of users includes users from said second plurality of users, receiving an invitation message from a user registered to said presence service to exchange content with another registered user also subscribed to the instant messaging service, and determining said communications state and said request for notification of said another registered user and deciding said content should be sent to said another registered user or stored by said instant messaging service depending on said communications state and said request for notification of said another registered user.

Further according to the fourth aspect of the invention, said register requests, subscribe requests, and invitation message conform to an application layer control protocol.

Yet further according to the fourth aspect of the invention, said application control protocol is a session initiation protocol (SIP).

Still further according to the fourth aspect of the invention, said information relating to presence pertains to a spatial location of said user.

Therefore, the invention solves the problem of transporting User Location within wired and wireless IP networks by using an application layer control protocol.

The present invention also provides a messaging solution that utilizes the application layer signaling protocol for informing the user about new incoming messages.

For the presence service, it makes use of a new data identifier promoted in IETF for storing and keeping the user location information when the user is moving. This approach uses the Spatial Location Payload (SLoP) for keeping track of the user location at any moment. Thus, the SIP will be used for registering that information in the Location servers that normally are collocated beside the SIP server acting like a SIP Registrar. Hence, a SIP User Agent will register his spatial Location information following the SLoP format into the SIP Registrar. That information will be stored in the Location Server and will be available for the rest of CSCF (Call State Control Function) (SIP servers)) in case of emergency calls or other services such as instant messaging.

For the instant messaging service, the SIP will be utilized for notifying the user about any event that he has previously registered to be made aware of. Once the user has been subscribed for receiving any new message, when that event happens the SIP server will send the notify message indicating that he has a new message. See the IETF draft-mahy-sip-message-waiting-00.txt. (SIP Extensions for Message Waiting Indication by Rohan Mahy and Ilya Slain). The innovation in the present invention is based in the use of the same mechanism but accessing SLoP information. Based on that information, the Message Service Center know exactly the user's situation and can send the NOTIFY message directly to the right SIP server. Hence, the user will be contacted immediately without any delay.

The SIP Register server receives the location information from the SIP User Agent (UA). That information should be updated frequently from the SIP UA every time that the user moves or updates his location. The SIP server containing the SLOP information will be queried by the Messaging Service to determine the exact location of the user. The SIP server will give back to the Messaging Service Center the location of that user and the signaling mechanism for accessing that user. In this case, the user has been registered through the SIP Registrar server, so the access would be done with SIP signaling. In another situation where the user has moved to GSM, H.323 or any other device, the SIP will indicate to the Messaging Service Center the new location and how it can be reached.

Actually, in the new UMTS systems there is no way to communicate the terminal about such events. There is not even any possible mechanism to keep the user location updated. The present invention provides the means for implementing such new services that are location dependent. This invention overcomes both problems, first the location and second the notification. A simple example is the instant messaging service. Many other services could make use of this solution.

This invention is a unique departure from existing solutions in the sense that it can provide multiple instances of information necessary to keep the user completely located and inform him about any important event.

These and other objects, features and advantages of the present invention will become more apparent in light of the detailed description of a best mode embodiment thereof, as illustrated in the accompanying drawings.

BRIEF DESCRIPTION OF THE DRAWINGS

FIG. 2 shows the syntax of an SIP REGISTER message, according to the present invention.

FIG. 3 shows an example of an SIP REGISTER request that is applicable to the register request shown in FIG. 10.

FIG. 4 shows an example of an INVITE message applicable also to the invite message shown in FIG. 10.

FIG. 5 shows the main fields that can be inserted in the header of spatial location payload data.

FIG. 6 shows a proposed syntax that includes the header and a body, showing both the format and attributes of the spatial location information.

BEST MODE FOR CARRYING OUT THE INVENTION

Figure 1:
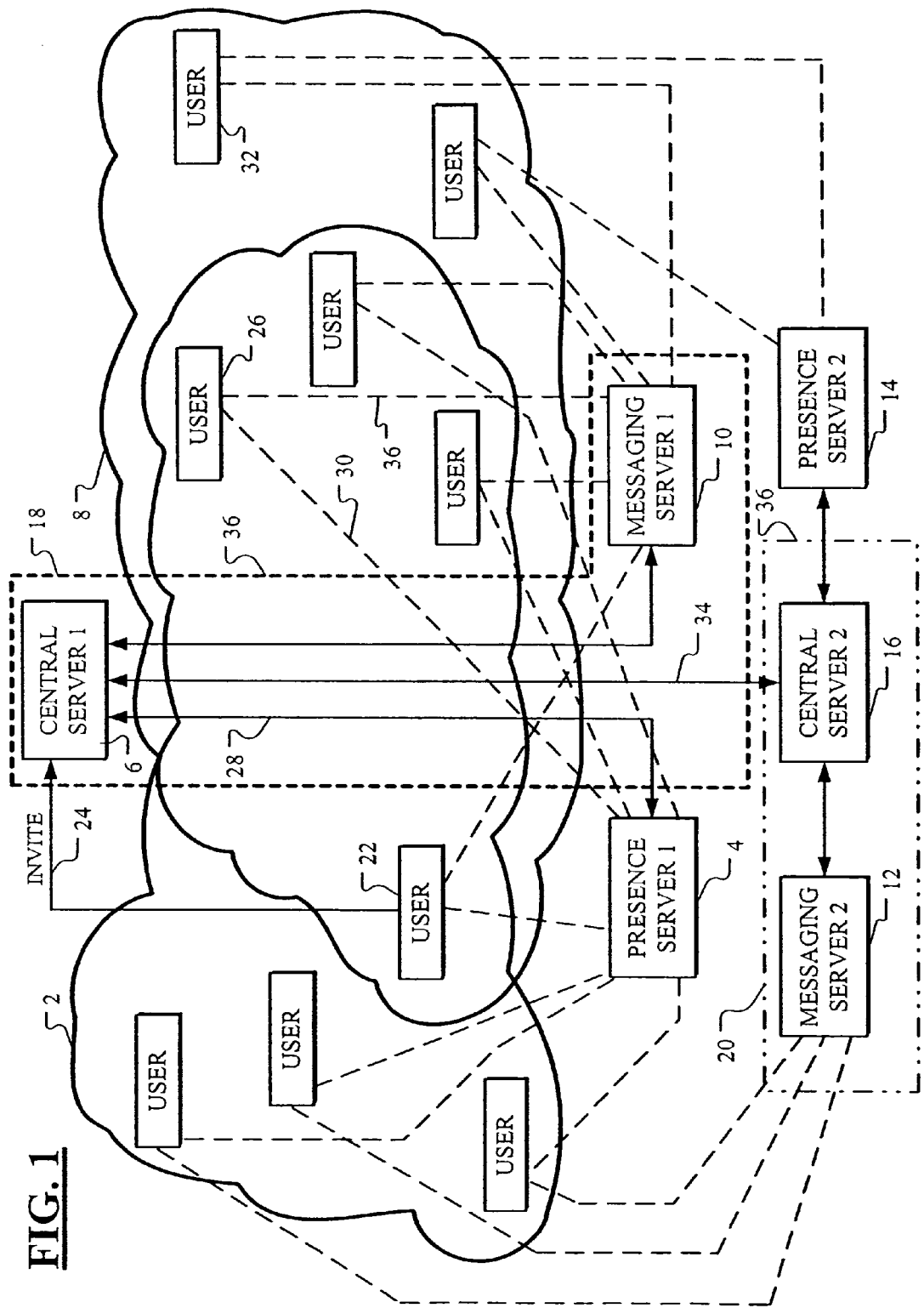
FIG. 1 shows a methodology and apparatus for carrying out the present invention in which a presence service is provided over an internet protocol network, as well a showing instant messaging and presence coacting as complementary services in an IP network.

FIG. 1 illustrates a methodology and apparatus for carrying out the present invention in which instant messaging and a presence coact as complimentary services in IP networks. A first plurality of users 2 are shown already registered at a first presence server 4. The registrations were previously carried out by a corresponding plurality of register requests from the first plurality of users to the presence server 4 by way of a first central server 6. The register requests include information relating to a corresponding communications state of each of the first plurality of users. Changes in the communications state of a given user can be changed by that user by re-registering with the presence server 4 via the central service 6.

A second plurality of users 8 are shown by dashed lines subscribed a messaging server 10. These user subscriptions were previously subscribed at the messaging server 10 by providing a corresponding plurality of subscribe requests from the second plurality of users by way of the central server 6 to the messaging server 10. The subscribe requests may, for example, have included information relating to a corresponding request for notification of an event or set of events which the users wish to be aware of. The subscribe requests can be updated at any time from the users 8 to the messaging server by way of the central server 6.

It should be noted that the second plurality of users 8 includes users from the first plurality of users 2. Looking at it from another perspective, the first plurality of users includes users from the second plurality of users. Some users in both the first and second pluralities of users 2, 8 are shown registered at the same presence server 4 and subscribed at the same messaging server 10. These users have very direct and therefore efficient use of the presence server 4, the central server 6 and the messaging server 10 for utilizing both presence and messaging. It should be realized, however, that other users can be registered at other presence servers, other central servers and other messaging servers and still utilize the advantages of presence and messaging used together in IP networks. For instance, some of the users of the first plurality of users 2 are shown registered at the presence server 4 but subscribed at a second messaging server 12. Likewise, some of the second plurality of users 8 are shown subscribed at the messaging server 10 but registered at a second presence server 14. The second messaging server 12 and the second presence server 14 are able to communicate with a second central server 16 which itself is able to communicate with the first central server 6 so that all of the users of the first plurality 2 can communicate with all of the users of the second plurality 8 using both messaging and presence services generally available and not restricted to a narrow area. The various servers, as well as the various users shown in FIG. 1, can be distributed over a wide area. The servers and some of the users may be fixed, but some of the users may be mobile. It will therefore be advantageous for purposes of the present invention for all of the users to be able to contact the services offered by such presence and messaging servers for utilizing those services alone, as well as other services, such as location based services which may act in conjunction with either the presence server or the messaging server or both.

The presence server can be made into a particularly powerful service by registering spatial location information from the users therein utilizing an application layer control protocol. This will be shown in detail below.

It should be realized that the messaging and presence services can be combined with each other or with the central server either individually or together. For instance, FIG. 1 shows the first central server 6 and the first messaging server 10 combined in a single first server 18 which combines the functions of a central server and a messaging server. Similarly, FIG. 1 shows the second messaging server 12 and the second central server 16 combined into a single second server 20 which combines the functions of a messaging server and a central server. Such functions can have many different forms which will be described by way of several examples. For instance, an inviting user 22 provides an invitation message on a signal line 24 to the first central server 6 inviting an exchange of content with an invited user 26. In response thereto, the first central server 6 provides a presence query on a line 28 to the first presence server 4. The user 26, having already been registered at the presence server 4 as indicated by a logical connection line 30, the first presence server 4 returns presence information relating to the registered user 26 on the line 28 to the first central server 6. The first central server 6 is responsive to the presence information about the registered user 26 for use in deciding whether the content proposed for exchange by the user 22 should be sent to the invited user 26, stored or refused. If the first central server decides that the content should be sent, the first central server 6 will cause the content to be sent to the user 26. This may be a transfer directly from the user 22 to the user 26 or may be through a specified transport path.

It should also be realized that if the invited user had been registered at the second presence server 14, such as a user 32, then the first central server 6 would respond to the invitation message on the line 24 by communicating with the second central server 16 on a line 34. The second central server 16 would then provide a presence query on a line 36 to the second presence server 14 for the same purpose as previously described in connection with the query on the line 28 sent to the first presence server 4. By having multiple central servers and multiple presence servers over many different areas, various presence services can be made available generally. In the just-mentioned example, either the first central server 6 or the second central server 16 can make the decision as to whether the content should be sent to the invited user 32 in appropriate control of the transfer, storage or refusal can be effected from either one.

Advantageously, the invitation message on the line 24, the presence query on the line 28 or on the line 36, are communicated according to an application layer control protocol, such as the session initiation protocol (SIP) known from RFC 2543.

In addition to the use of presence to decide whether the content should be sent to the invited user, stored or refused, it is advantageous according to the present invention to utilize a messaging service for subscribing the users shown in FIG. 1 in such a way that they may provide information as to their messaging preferences. In such a case, for instance, the first central server 6 is responsive to the invitation message on the line 24 for also providing a subscription query on a signal line 36 to the first messaging server 10. As shown in FIG. 1, the invited user 26 has a logical connection 36 to the first messaging server 10, wherein the user 26 has previously subscribed to a messaging service provided by the first messaging server 10. Consequently, the first messaging server 10 responds to the subscription query on the line 36 by providing notification information relating to the subscription service subscribed by the user 26 indicative of the user's preferences. Such might include, for instance, notification of an event wherein the central server is responsive to the notification information for use in deciding 10 whether the content should be sent to the invited user, stored or refused. Again, the subscription query and the notification information may be exchanged on the signal line 36 according to an application control protocol, such as the known SIP.

Presence as Spatial Location Applied to SIP

The presence information relating to a registered user may include spatial location information. The basic requirements for providing the spatial location information of devices connected to wire and wireless IP networks are described below. According to the teachings of the present invention, the Session Initiation Protocol (SIP) may be used as transport and Spatial Location Information (SLO) as the data format inserted in the SIP payload. See IETF-draft-loughney-spatial-arch-00.txt entitled "Basic SloP Architecture proposal" for detailed information defining a SloP architecture. The description below introduces the relationship between the SIP for registering and transporting the data and the SLO as the location information structure. Also described is the integration of both elements and the dependency between them. The result is a common architecture for providing the user location information over IP networks. Also shown is the relationship among the network elements involved in the architecture and the overall functionality.

As mentioned above, the SIP is an application layer signaling protocol used for creating, modifying and terminating multimedia sessions among different parties. It is mainly used as a call control protocol in IP Telephony. The SLO is a data structure defined for carrying user location information. It defines a data structure including location information, security requirements, policy mechanism and entities involved forming a complete architecture. Included in the requirements for exchanging the SLO structure among entities, is a need for a transport means, which must be scalable and secure. In this invention SIP used as the transport protocol for the SLO data fulfills these requirements.

The invention shows how to effect a common service for providing the user location following the SLO structure, using the SIP as the transport mechanism. Disclosed herein is how the SIP entities fit in the SLO architecture requirements while providing all the requisites needed by the SLO definition. Basically, the invention shows how SLO and SIP may be complemented to perform a global user location service.

The SIP protocol and all the entities involved in a SIP session are known from RFC 2543 but will be briefly described below. Also described are the SIP messages and the mechanisms provided by SIP for Addressing and performing user mobility. Next to be described below is the SLO, where the requirements for defining a common architecture for providing the SLO data over IP networks are explained. The SLO structure and the different parts of the message adopted for providing a complete location information are described. Third, how both the SIP and SLO architectures fit together is illustrated, the former as the transport means for the latter. The SLO requirements are described in the context of the existing SIP functionalities. Finally, some basic scenarios of how SIP and SLO will behave together in a normal transaction are shown.

SIP Introduction

The Session Initiation Protocol (SIP) is an application-layer control protocol that can establish, modify and terminate multimedia sessions or calls. SIP is text-based, using ISO 10646 in UTF-8 encoding throughout. This makes SIP flexible and extensible and since it use for initiating multimedia conferences rather than delivering data, the overhead for using text-based is not significant. The syntax of the messages is similar to HTTP but SIP instead can carry the transaction using either UDP or TCP. The message can be either a Request or Response and it is created following the format of D. Crocker, "Standard for the format of ARPA Internet text messages," RFC 822, IETF, August 1982.

SIP Entities

The entities involved in a SIP session are the User Agent, the Proxy server, Redirect server, Registrar server and the Location server.

The User Agent (UA) can act like a client (UAC) that is a client application that initiates a SIP request. The User Agent can also act like a server (UAS) that is a server application that contacts the user when a SIP request is received and send back a response on behalf of the user.

The Proxy server is an intermediate entity that behaves like client and server simultaneously. It can interpret and modify the request before forwarding it to other servers.

The Redirect server is an entity that receives the request and maps the address to which the message was initially directed into zero or more new addresses. Then, the client should try again using the new addresses returned from the Redirect server to contact the caller or another SIP server that can handle the message in case of special requirements.

The Registrar server is a server that accepts the user registration (REGISTER message) and can make this information available through the location server The Location server is an element used by a Redirect or Proxy server to obtain information about the possible location of the callee. It can include Registrar server or any mobility registration protocol available for this purpose.

Message Structure

The message consists of a start line, one or more header fields, an empty line (Carriage-return line-feed, CRLF) and an optional body. Three examples are shown in FIGS. 2, 3 and 4.

Basically, the start line indicates if it is a Request (INVITE, ACK, OPTIONS, BYE, CANCEL, REGISTER, etc.) or a Response (100 Informational, 200 Success, 300 Redirection, 400 Client Error, 500 Server Error or 600 Global Failure).

The message header is composed by multiple headers indicating, the Origin ("From:"), Destination ("To:"), Call Identifier ("Call-ID:"), Message Sequence ("Cseq:"), Transaction path ("Via:"), the length ("Content-Length:") and content ("Content-Type:") of the body if it carried in the message.

Finally, the message body can contain any kind of data and its interpretation depends of the type of message. Generally the content of the body can contain a session description following a specific format such as the Session Description Protocol (SDP), text or XML scripts. The "Content-Type" header field gives the media type of the message body. If the body has concrete encoding it is indicated in the "Content-Encoding" header field. The body length is given in the "Content-Length" header field.

SIP Addressing

The entities addressed by SIP are user at hosts and they are identified by a SIP URL, see T. Berners-Lee, R. Fielding and L. Masinter, "Uniform resource Locators (URL)," RFC 1738, IETF, December 1994. The URL takes a form such as user@host where the user part can be a user name or telephone number and the host would be either a domain name or a network address. The SIP URLs are used within the SIP messages to indicate the originator (From), the current destination in the start line (Request URL) and the final recipient (To) of a SIP request. Its interpretation follows the guidelines of RFC 2396 "Uniform resource identifier (UR1)," IETF, August 1998, by T. Berners-Lee et al and the syntax is described using Augmented Backus-Naur form, using characters reserved within any given URI component.

The SIP URL is used for locating a user based on DNS SRV lookup. The client queries the DNS server including for address records for the destination address. If the DNS does not return any address record, it means that the end user cannot be located. Other alternative protocols for locating a user are finger (RFC 1288 D. Zimmerman, "The finger user information protocol," RFC 1288, IETF, December 1991), rwhois (RFC 2167 S. Williamson, et al. "Referral who is (rwhois) protocol v. 1.5." (RFC 2167, IETF 1997), LDAP (RFC 1777 W. Yeong et al "Lightweight directory access protocol," RFC 1777, IETF, March 1995) and other multicast based protocols available to determine where a user might be reachable. It is possible to receive a list of locations because the user might be logged in at several hosts simultaneously or because the location server has inaccurate information. The way to contact the user in such cases is to try each of the listed addresses until the user is located.

SIP Mobility

SIP transparently supports name mapping and redirection services that enables personal mobility. Personal mobility is the ability of end users to originate and receive calls and access subscribed services on any terminal in any location and the ability of the network to identify end users as they move. Personal Mobility is based on the use of a unique personal identity based in the above mentioned SIP URL.

The SIP also supports terminal mobility by proxying and redirecting request to the current location where the user is logged in. This process has been briefly described above, where it uses the possible URLs where it is supposed that the user can be reached. With SIP the user can register his current location and even the service profile required for the session. In the registration process the user can provide his personal identity for achieving Personal Mobility. Afterwards, for locating a user, the SIP needs the Location server, which can use DNS, LDAP or any other similar mechanism for obtaining the address where is located the client.

SIP and SLO

The user can register temporarily at the local SIP server where he will be attached for a certain period of time. That registration only indicates that the user is located at that point. For newer services coming into being (Location based services, Emergency calls, etc.) the user needs to provide more detailed information of his situation. Using the framework provided by SIP, it is more effective that in the same registration process the user inserts more information about his location.

Such information and the requirements to register that information may follow the architecture requisites defined in the SLO working group. See Haitao Tang, "A Proposal for the Version-01 BOF Charter," Feb. 21, 2000 located at http://www.nre.nokia.com/ip-location/charter-v01-00.txt. See also IETF draft-tand-islf-reg-00.txt for "Problems and Requirements of Some IP Applications Based on SLO Information" by Tang et al, February 2000.

Hence, a simple SIP registration becomes more effective using the SLO data as payload. In this way, the user identifier used in the SIP (URL) can be linked to more complete information about the user's geographical location. This purpose may be effected by adding the SLO as the SIP Content Type during the registration. Further guidance is provided below regarding all the entities and conditions for using the SLO structure properly.

SLO Introduction

A presence service can provide address Spatial Location (SLO) information establishment, exchange, and utilization for IP devices. The objective is to let IP-addressable devices and applications be able to establish/acquire and provide the spatial location data concerning themselves and other parties when allowed. Security is a fundamental requirement for many situations of the data exchanges and services. See above mentioned BOF charter document by H. Tang. The main constraints for any implementation will be security and scalability.

The former is important to provide a general trusted service, where all the information is reliable. For this issue it is important to establish various security channels between the entity that provide or request the information and the entity that stores and retrieves that information for other Services (Emergency, Personal services, Signaling, etc.).

To obtain certain security on the communication means the existent secure protocols and encryption mechanisms such as 3DES, SSL, IPsec, PGP, etc. can be used. Since the SIP is chosen for the SLO transport, it already provides a secure channel using PGP.

The other issue is the scalability and it is as important as security. In the present architecture all the various scenarios have been considered as well as the amount of information to be exchanged. The type of data exchanged between the possible entities in different scenarios and its updates have been analyzed as well. Obviously, a fixed user only needs to provide its location once and it will be permanently there. Afterwards, a mobile entity (IP terminal, phone, etc.) is considered, and in this case the user provides his initial location with the possibility of spatial translation. Hence, after the notification of the initial location it has to be tracked during his movements, but updates of location are periodically required. The periodicity of the updates depends on the velocity of terminal, i.e., if the user is walking the updating period can be longer than if the user is moving with another means of locomotion (car, bike, etc). These considerations have to be taken in account for the traffic generated on each situation and the protocol chosen for those updates.

Spatial Location Architecture

Below are identified the Basic Requirements for designing the basic architecture. Described are the main characteristics that the service should contain in its essential design. It has to be considered that in the actual market there are many possibilities for providing similar serviced. Considering that the aim of this invention is to provide a common infrastructure that is to be used worldwide and in multiple devices, it has to be flexible, scalable and secure. These properties are crucial to meet the requests of various service providers and become well accepted as the common instrument for providing spatial location.

Spatial Location Representations

It supports different location data representations/expressions. For interoperability reasons, it has an absolute location system as the supported format by all the service speakers. It lists all other absolute location systems and their data formats, which may be supported by the service elements on an optional basis. It also supports for descriptive locations while no syntax and standard is defined in the current architecture scope.

Representation Negotiation Mechanism

There is a representation negotiation mechanism provided. The mechanism supports the selection of the wanted location system and data format between two speakers. The descriptive location negotiation is considered during the location registration. Once the user registers his location, he will indicate the format of that data. In case a third party needs to request that information it will be notified about the location information format (those formats will be previously specified and publicly reported).

Security Mechanisms

There is an authentication mechanism selected/defined between SLoP speakers, to guarantee the integrity/authenticity/accessibility (e.g., no spoofing and certain DOS attacks) of the involved parties. Use of the authentication and/or the encryption mechanisms is to be settable by the service endpoint (user may enable or disable the use of the mechanisms). It is done per session or per endpoint. The primary design for security in the architecture is end-to-end.

Policy Mechanisms

There is a policy specification language selected/defined for specifying various policies that are relevant to the architecture. A PIB is defined for all the speakers. The policy instance for a target should be available to the server representing the target, where the policy instance tells how a server shall serve the spatial location of the target.

Server Discovery Mechanism

There are two aspects of this issue. There is a discovery mechanism for the Target to find out the server where he can register his SLO data. Secondly, there is a discovery mechanism selected/defined for a client to find the appropriate server for a given target when needed.

The Server Discovery is an Important Issue for scalability problems. There are different approaches for obtaining the closest Location Server or its equivalent. The first choice is using a static preconfigured address of the Server where the user is subscribed. The optional choice would be using multicast messages for locating the nearest Location Server to establish the initial connection. There are many alternatives for achieving an efficient multicast mechanism (Hussein F. Salama et al "Evaluation of Multicast Routing Algorithms for Real Time Communication on High-Speed Networks," N.C. State University.) After being located, the Server will present a policy mechanism for user authorization to continue with the service.

In the case of using SIP as the control protocol, it already provides the server discovery mechanism for both cases, i.e. for the Target and Client trying to contact the Location Server either to register or to get the location information.

Transmission and Reliability Mechanism

The design of a reliability mechanism is affected by the transport protocol below the Spatial Location architecture. Various transport protocols have different reliability levels. If TCP is selected, there is no need to have this extra mechanism. However, TCP seems too "heavy" for some services. Since this service must be independent of the type of communication and the reliability should be guaranteed, the transport protocol will care of this issue. The transport protocol also has to ensure the security for different mechanisms according to the user device and service provider. At this point SIP uses UDP or TCP independently based on user requirements.

Message Coding Mechanism

There is a coding mechanism selected/designed for coding/decoding all the messages. All the users must support the coding mechanism.

The users support the basic coding mechanism selected as default for all the transactions. A standard scheme is defined based in a header and a message body. Both are coded using text-based language such as XML. In the header are defined the default fields needed for the protocol transaction including encryption information and in the body are inserted the information according to the specific message. Using an extensible language permits later extensions with new headers or features. This way it has the reliability of the XML format coding and the extensibility of the text-based language. In the concrete case that the body is carrying location information it can be inserted using the Geography Markup Language (GML) (Geography by Markup Language (GML) v1.0 OGC Document Number: 00-029-12-May, 2000. http://www.opengis.org/techno/specs/00-029/GML.html). The proposed naming is based on Uniform Resources Identifiers (URI) (See RFC 2396) and it follows the syntax defined for Target Information ID (TID) and Target record Accessing ID (TAD) in Tang et al "Serving Spatial Information over Internet" and in the "Target Naming Scheme" set forth in IETF draft-tang-spatial-target-00.txt. These definitions compose the Identifier for persistent data (TID) and roaming purposes among Location servers (TAD). Preferably, either the TID or TAD will be present in the headers of all the SL messages. Furthermore, the message will preferably contain the Spatial Location representation described and attributes described below.

SLO Entities

These definitions are based on the architecture requirements identified for providing SLO information.

Client is the element that requests the Physical Location of another element (called Target). It can be either a user device requesting the location of another terminal or an application that needs to obtain the user location data for providing additional services (Location Based services, Emergency notifications, etc). The Client behaves like a Target when it is providing the SL information.

Target is the element whose Physical Location the Client requests. It can have capabilities for resolving its location or not. In case of the simplest equipment, it will send to its server the Spatial Location structure without the geographical information. In this case the data structure includes the user requirements and basic information and within that data is included the rights to the server for resolving the Target location and filling the Spatial Location structure.

User Interface (UI) is what the user utilizes to interact with the Location Server (LS). The UI is typically implemented as an integral part of a mobile terminal or as an application on top of a WEB and/or WAP server belonging to a Network Provider. Therefore, the UI is physically implemented on the called Target and based on the SIP nomenclature it will be a SIP User Agent.

Location Server (LS) stores and distributes location information related to a specific terminal. It is typically implemented in the terminal or in a server at an arbitrary place, not necessarily owned by a Network Provider. The Location Server will interact directly with the User Interface. Thus, the LS will receive the location information and presumably will use well-formed and reliable protocols for provide that information to the Client in case the Target had specified this requirement when his location information is stored on the LS. In the same manner the location information will be provided directly to the Client from the LS.

Positioning Function (PF) determines the location of a given terminal. It is typically an integral terminal function, e.g. based on GPS, Location Information Service (LIS) (M. Korkea-aho "Some Scenarios for an ISL Architecture" Mar. 10, 2000, IETF draft-korkea-aho-isl-scenarios-00.txt") or Local Positioning System (LPS) (J. M. Polk et al "Spatial Location Protocol Location Server Authentication" Mar. 10, 2000, IETF draft-polk-slp-loc-auth-server-OO.txt) provided by a Network Provider, e.g. based on radio cell information or a triangulation mechanism. It can be located at the Target (SIP UA) or at the LS if the Target does not have this capabilities.

Information User (IU) is typically a value-added service, a lifesaving service that can access to the user location information previous authentication. It behaves like a client when is accessing the LA to know the user location information that has been 10 required by any external elements such a routing, signaling protocol, lifesaving service, etc. And the IU will also perform as a server entity when it acts such an interface for accessing Directory services or local facilities (taxi, restaurants, etc). In this case the IU will know the user location through the LA and will take care of requesting the services needed by the user.

Messages Structure

The format of the messages has to be defined according to the location needs. The important part of the message corresponds to the location information, which can be defined in different ways depending on the device. It was mentioned in the Requirements section that this information would be negotiated according to the user device capabilities. The message format based in a header and a body. Thus, the header will contain the default data for security and other properties. The body of the message will carry the location information or any other data. If the device has no capabilities for calculating the location, then the body can be empty and the message is just a recipient of the user demands about his information. The main fields inserted in the header could contain the data shown in FIG. 5.

Apart from these fields it is necessary consider also others to perform the initial contracting, update the changes and the rest of protocol behavior.

FIG. 6 depicts the proposed syntax based on the message coding presented in the above section describing the Spatial Location Architecture. It contains the header and the Body parts, where the former contains the Target identifier and the essential data of the structure and the latter includes the location data and attributes identified in this section.

Spatial Location Architecture Using SIP

Based on the illustrated Architecture Requirements and elements an architecture based on the SIP signaling protocol is disclosed. The SIP is chosen as transport protocol since it can work either with TCP or UDP. Consequently, this approach will incorporate security and reliability mechanisms. In this disclosure the SLO data format will be part of the protocol payload and it will be indicated in one of the protocol headers that it is carrying SL data.

Spatial Location Representation

Accordingly, the SLO information will be part of the SIP message body. This body will contain the Location message with the structure and attributes defined above. The SIP is used as a simple transport mechanism that will be well extended since it has been adopted as Call Control protocol for IP Telephony Signaling. The content of the body in the SIP message is indicated in the "Content-Type" header. The IANA allows the registration of new types of contents and it would be indicated in a manner similar to "Content-Type: application/SLO". The SIP permits encryption of the entire payload in case a high security rate is required.

Figure 7A:
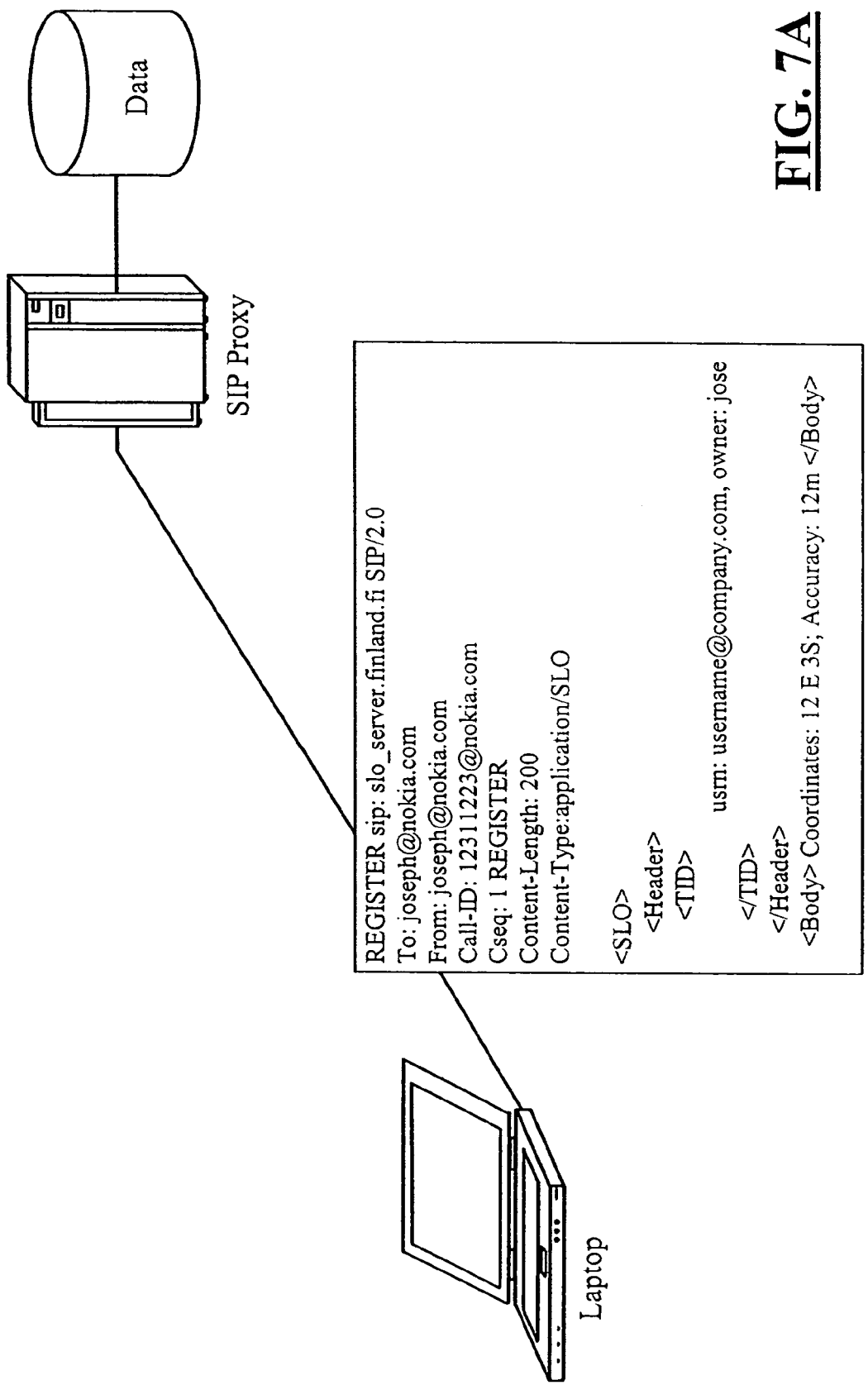
FIG. 7A shows SIP registration using SLO.

FIG. 7A illustrates an example of a SIP registration where it is using the SLO as payload. After the registration the SLO data is stored in a database that can be the SIP Location server and from there can be retrieved if it is necessary to run any supplementary service.

Security Mechanism

The SIP protocol has defined various security approaches based in end-to-end and hop by hop. The SIP servers may require user authentication previous to any access. The SLO architecture will rely on the transport protocol for this issue, the user just indicates the rate of security designated and the SIP will take care of it. The SIP enabled servers will authenticate and encrypt the data according to the restrictions defined by the user. If the user tries to register and it is not allowed the Registrar will return a "401 Unauthorized" response. It indicates that the registration requires a previous authorization using any of the mechanisms defined in SIP. The user has to re-issue again the request including the "Authorization" header where the credential containing the authentication information is added.

The SIP security is implemented basically using two approaches, using HTTP basic and digest schemes J. Franks et al "HTTP authentication: Basic and digest access authentication," RFC 2617, IETF, June 1999 as well as using PGP J. Callas et al "Open PGP message format" RFC 2440, IETF, November 1998.

The former approach uses the headers "Proxy-Authorization", "WWWW-Authenticate" and "Authorization" in the various messages based on the RFC 2617. The Registrar will send back a 401 response indicating that it needs to be authenticated. Then the user will send back the registration including the "Authorization" header with the relevant information.

The latter approach uses the syntax based on the PGP authentication mechanism. It is based on the model that the client authenticates itself with a request signed with the client's private key. The server can then ensure the origin of the request if it has access to the public key that should be signed by a trusted third party. The algorithms of this scheme are based on RFC 2440. The headers involved in the transaction are the "Authorization", "WWWW-Authenticate" and "Response-Key" for providing the user's public key extracted from the pgp key ring.

Server Discovery

At this point the SIP provides the server discovery mechanism using pre-defined configuration or multicast queries to a DHCP server. When the user terminal starts up it will immediately obtain the address of its closest SIP server. Another discovery feature also in the SIP protocol is to resolve the nearest SIP server address using the SRV records from DNS.

Once the use has the server address it can send the SIP REGISTER message containing the SL information in its body. The Registrar server that behaves like the Authentication Server (AUS) required in the SLO architecture will authenticate the initial message. If the contacted SIP server is not a Location Server (LS) the message has a specific header for discovering the Location Server. It will be indicated in the SIP header "Require" sent in the REGISTER message. Hence, for indicating that the incoming message contains Spatial Information and needs to be processed by a Location Server, the SIP REGISTER will have the following header: "Require: SLO-server". It indicates that the user is registering his location and needs a Spatial Location Server to manage this data. In case that the server contacted has no SL capabilities the user will receive back a response where the "Contact:" header includes the address of the new SIP server, which can handle that message. An example would be like this: "Contact: slo-server.nokia.com".

Once the user has contacted the SIP Register the client should start the registration where it will include the SLO in the payload.

Afterwards, the user knows the address of the Registrar where he can send the request, which includes the SLO data. Now, it is necessary to establish a secure transaction for providing the information to the Registrar. The SIP will handle the security of the transactions during the registration based on the mechanism described in the above "Security Mechanism" section.

Figure 7B:
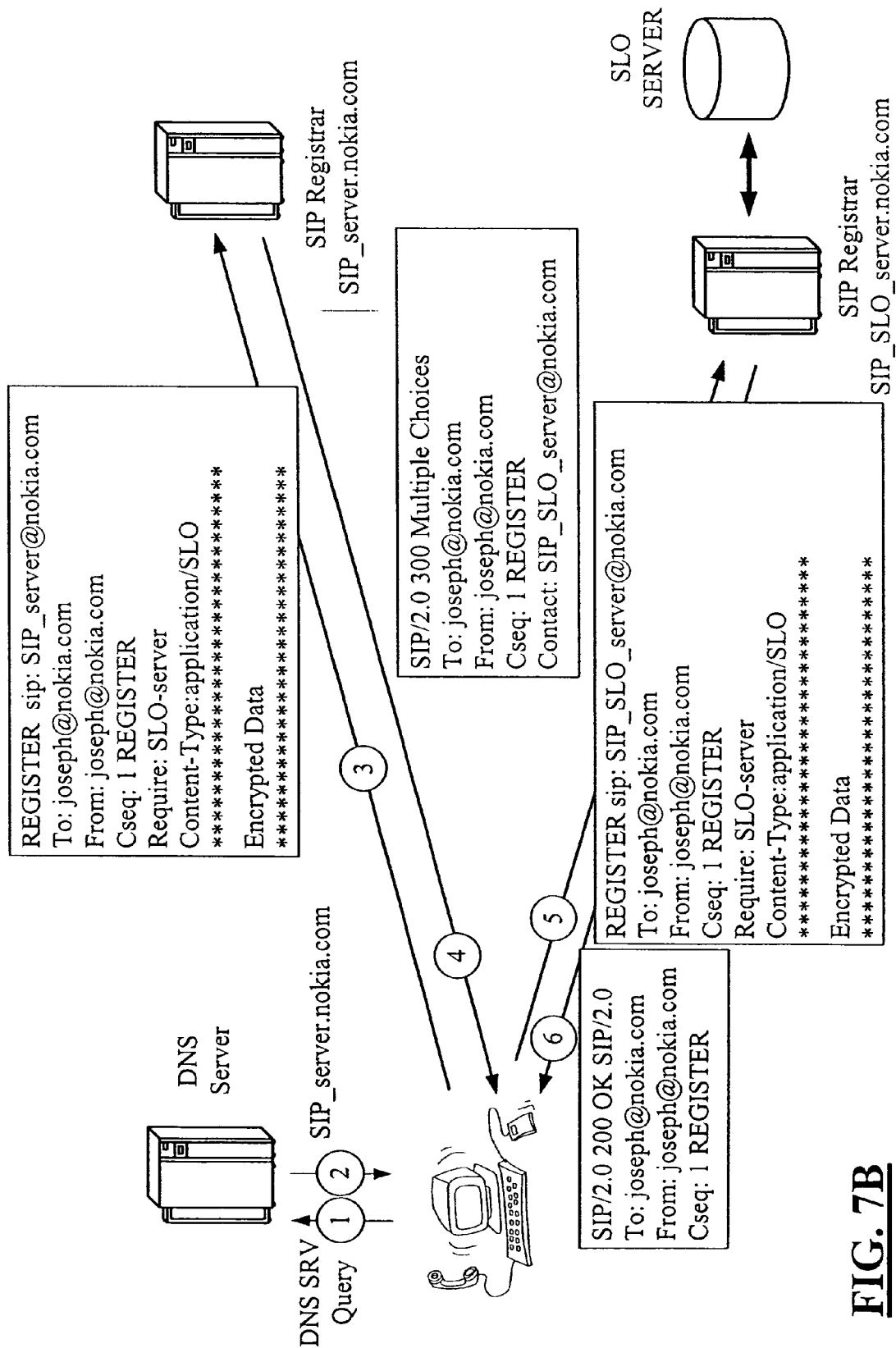
FIG. 7B shows the registration process including server discovery.

The whole process is depicted in FIG. 7B which shows the different steps till the registration succeeds. The messages 1 and 2 are just the SIP server discovery independently of whether it is SLO capable or not. The messages 3 and 4 are sent when the user is trying to register the SLO information in the SIP Registrar but unfortunately, for the illustrated example, it does not have SLO capabilities. Instead, the response 4 indicates the location of the closest SIP sever that can handle a SLO message. Finally, in the messages 5 and 6 the registration is achieved and the SLO data is stored in the SLO server which can be accessed for any other services using SIP or any other Directory Access Protocol.

Representation Negotiation

After being contacted the Spatial Location server performs a representation negotiation. The SLO architecture has a default format but it should understand other formats that will be previously negotiated. In case the information received cannot be interpreted or it is coming from non IP device, the SLO server will need to contact a Spatial Location Gateway (SLG) to translate the information received in the SIP payload. Finally, if there is no way for the SLO server to handle the message, it will send back an error SIP message like: "SIP/2.0 501 Not Implemented" or "SIP/2.0 503 Service not available".

Since the SLO is a new service, it remains a possibility that the contacted SIP registrar does not support this feature. There are two possibilities, the first one is trying to register with the closest SIP Registrar and wait for its response, and the other solution would be to use the OPTIONS message for querying beforehand the Registrar's capabilities. In the former case, if the registrar can handle a SLO message the registration will succeed, otherwise the User Agent receives a 300 response with the address of a SLO enabled SIP Registrar. In the other case, the User Agent needs to negotiate this capability with the registrar. The client will send an OPTIONS message to the registrar for indicating that he needs a SLO based registrar. The registrar can send back a 200 OK response, which means that it can manage this type of registration. Otherwise, the registrar returns a 300 Multiple Choices response, which means that the requested capability can be accessed through the proxy given by the "Contact:" field.

Scenarios

Scenarios can be envisioned such as described in IETF draft-polk-slp-loc-auth-server-00.txt entitled "ISL Architectural Considerations" Mar. 8, 2000 by S. Nyckalgard and J. Loughney. Basically, SIP based devices have to be differentiated from general IP appliances.

First of all a lookup is needed for finding the Server to which the messages will be addressed. As mentioned above, the Target can use a multicast mechanism for searching for the closest Location Server to its actual location. In case of an SIP enabled device it will use the SIP server discovery mechanism already described.

The Target is by default an IP based device and during this phase the Target will provide its new assigned address and its device capabilities to the Location Server. The LS will respond to the Target either with its own address in case that satisfies the user device requirements or it will give back the address of the Location Proxy Server that will be able to translate the Target requirements to the standard message format of the protocol. The Location Server or the Location Proxy Server (LPS) will thus be the entity that will take care of this first contact with the Target according to the decision taken after the Representation Negotiation phase.

If the Proxy server takes care of this phase it will be necessary to maintain a cache of the specific Location Server that has the user profile. Those caches would be updated and replicated among the different proxies to be aware of the respective LS that handle the information of each Target (Authorization, billing, etc.) See J. Luciani et al, "Server Cache Synchronization Protocol (SCSP)" IETF RFC 2334, April, 1998.

After the LPS has been discovered the Target will start the Negotiation phase. On one side the Target will provide its identification and service requirements to the LPS and in the other side the Proxy (based on its cache table) will contact the Location Server that handles the private information of that user. The LPS will receive back an acceptance from the LS, or not, in case of denial of service for that user.

Furthermore, after the negotiation phase the LS will continue the service procedure through the Proxy or directly. This process is already described in the above section for SIP enabled devices.

Above was identified the need for maintaining a cache table in the LPS for contacting the LS to which that user has been subscribed. The basic steps would be Server Discovery, Service Negotiation, and Setting the Policy Mechanism. The latter step is performed after either the LS or the LPS have trusted the Target. In this state the Target will set up the policy that will be executed with any client try to request his location information. It means that the Target can make its information globally available or totally private. In the latter case it will be necessary to establish a secure channel for the transmission of that information between the Client requesting the information and the server. However, if the Target has designated the Information to be totally public any untrusted Client can request his location information.

Roaming Scenario

This scenario is similar to the basic scenario with the difference that the user is roaming to a different location. It means that the user is already registered at the home SL server and has assigned a Target record Accessing iD (TAD) for that Target. Hence, the home server has already stored both the user Target information ID (TID) and TAD. There can be more than one TAD for a given TID. The TAD can be time or place dependent and it is only temporally attached to the visited server. Now, the Target moved to a different location is going to update his data. The process is the same but now the SIP message is carrying the SL structure in the Payload including the TAD instead of the TID. This is the default TAD assigned to the target by the home server and it serves as a default record accessing ID. In roaming situations, the visited location server becomes the current location server representing the target. After the authentication and Representation Negotiation the visited server allocates a temporary TAD for the Target and informs its default location server of the target's current temporary TAD. The default location server of the target can then bind the two TADs (the default and the temporary).

Furthermore, for finding out the actual point of attachment of the Target, the TAD that indicates the assigned address will be used. The TAD will unequivocally point to actual location of the Target.

Conclusions about Application of Spatial Location Information to SIP

The inclusion of the SLO data as part of the SIP payload during the registration has been disclosed above. Placing this new element in the SIP transaction improves the location server compared to the prior art. The user that has been registered using the SLO data makes his location available for other services and it also specifies how he can be reached. Consequently, once the Location server obtain the user information based on the SLO data, it can send the messages directly to the right situation where the user is located at that moment. It avoids the redundant information received from the location server when the user is logged in various places. The Caller avoids sending multiple requests trying to contact the user.

The user location information can be stored in different types of databases to be globally available for other purposes. Those databases will be accessed using another procedure that will require authorization and a Denial of Service in case the user in the SLO data defined such. The access to the data can be done depending on the databases used but it is open to the decision of the implementers. This part of the service is also considered in the SLO requirements as the transaction between the SLO server or proxy and the SLO Client. A suitable solution would be to use the SIP also for this purpose, extending the protocol with some specific headers for requesting the user location information.

Furthermore, this new service leaves open the framework for developing new location based and other future services. The SLO Clients will access the data for providing those location-based services.

In summary, this disclosure sets up the procedures for registering and requesting the SLO information in global databases using SIP.

An Implementation of Instant Messaging and Presence Using SIP

Introduction

The following embodiment implements Instant Messaging and Presence using SIP protocol for various embodiments including a mobile telecommunications embodiment particularly suited to but not necessarily restricted to next generation services.

Figure 7C:
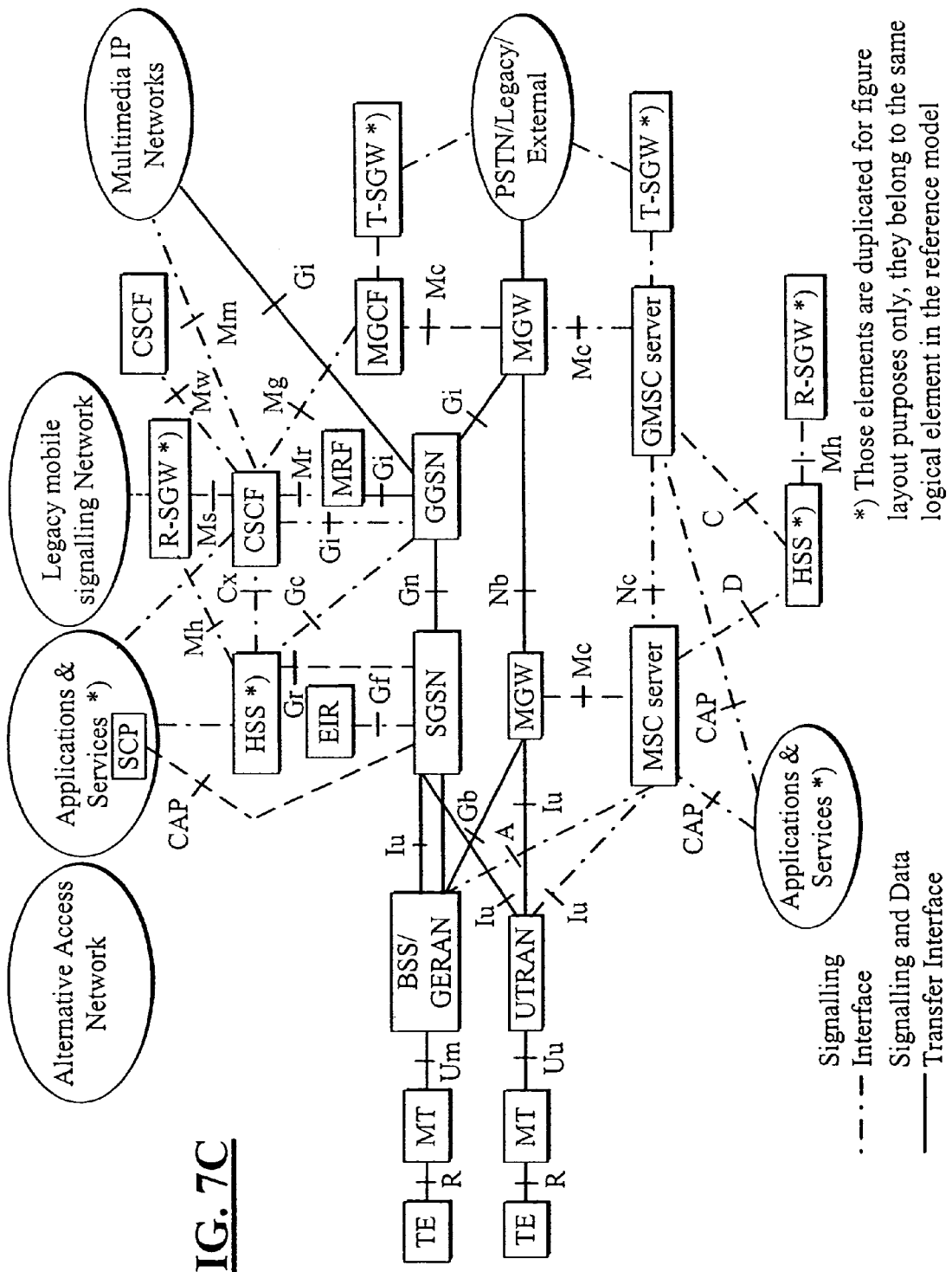
FIG. 7C shows the third generation release 2000 architecture.
Figure 7D:
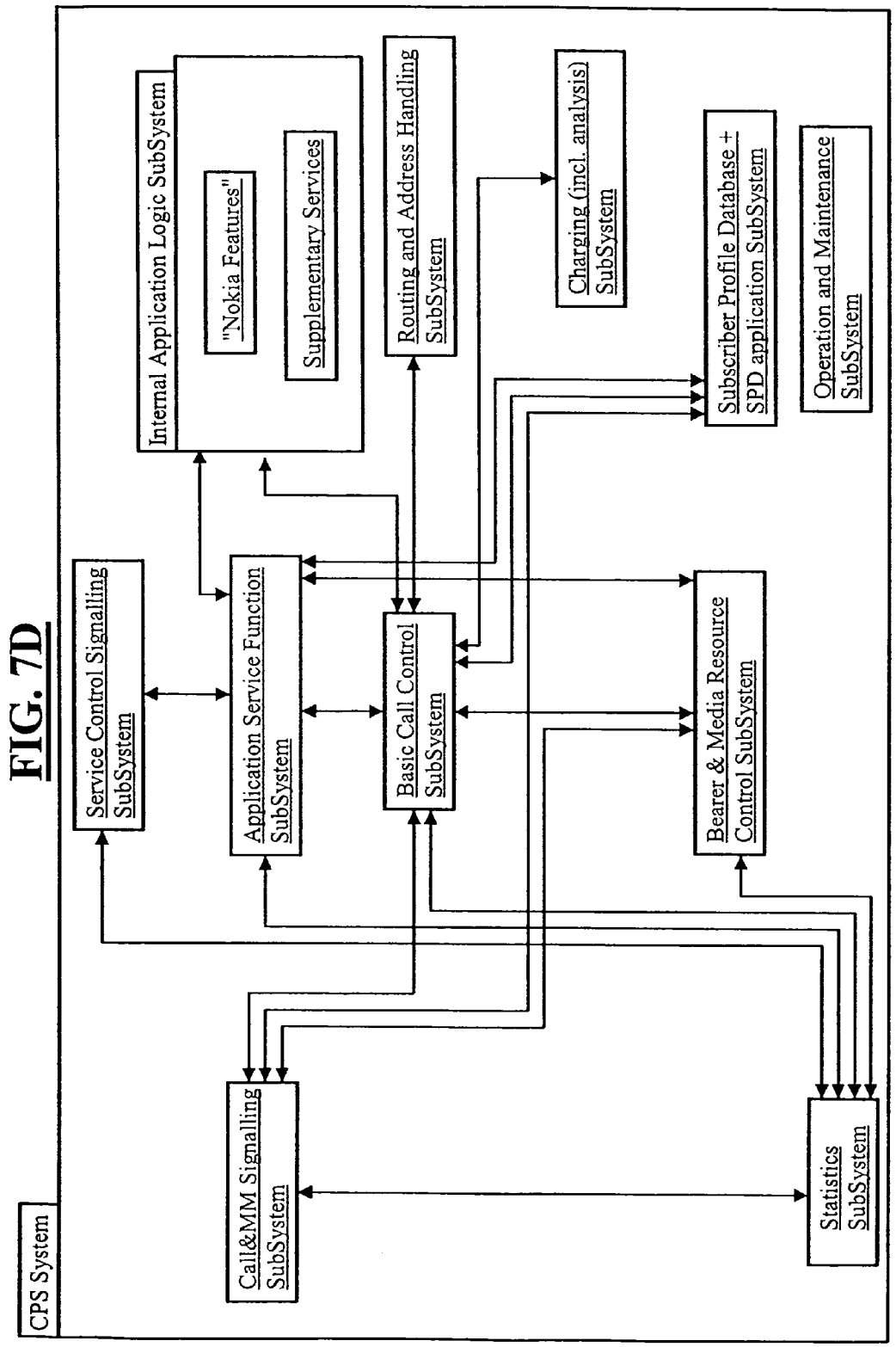
FIG. 7D shows the position of the SIP-SS inside the CPS.

The SIP is defined as the signaling protocol for UMTS networks at the Call State Control Function (CSCF), which is part of the Call Processing Server (CPS) network element. The aim of the following is to provide a complete description of the SIP as the signaling protocol for call control between CSCF within the Messaging and Presence process. The environment is the 3G.IP reference architecture and the 3GPP release 2000 All-IP architecture, which is depicted in FIG. 7C.

The SIP-Signaling Services are implemented in the Call and Mobility Management Signaling (CMS) subsystem in the CPS according to FIG. 7B.

Presence Service

The 3GPP generation is using SIP for signaling but it has to deal with the existing systems. The new architecture has to support the legacy of other prior services such as SMS and it has to improve it with new features.

The basis of the Presence Service is first of all to define a common data structure where the user location information is specified. XML is preferred as the framework for that purpose. A good example is presented in the draft "An XML Format for Presence Buddy Lists" by Rosenberg et al at draft-rosenberg-impp-buddylist-OO.txt. Within the same context the IETF is working in defining a specific format for spatial location information by J. Louglmey and J. Costa-Requena "Basic SloP Architecture Proposal," IETF draft-loughney-spatial-arch-OO.txt.

This part of the disclosure is mainly focused in the second approach that is designed for carrying location information based on coordinates, Cell-Id of the mobile at each moment or the like. That format provides a general support for inserting the user data and additional information to reach him.

As discussed above, in this disclosure it is proposed to use the SIP as transport protocol for carrying that data format either in XML or in another concrete format.

For that purpose the use of a new Content-Type attribute is shown for indicating that the SIP contains that information on the payload such as:

Content-Type: Presence-Info/TID

What follows is an example using a Presence Service. Described is a specific situation where the user registers her information to be available for another user or making use of Location based services. The examples show how the whole registration and the security mechanism provided by SIP is performed for supporting user privacy.

Figure 8:
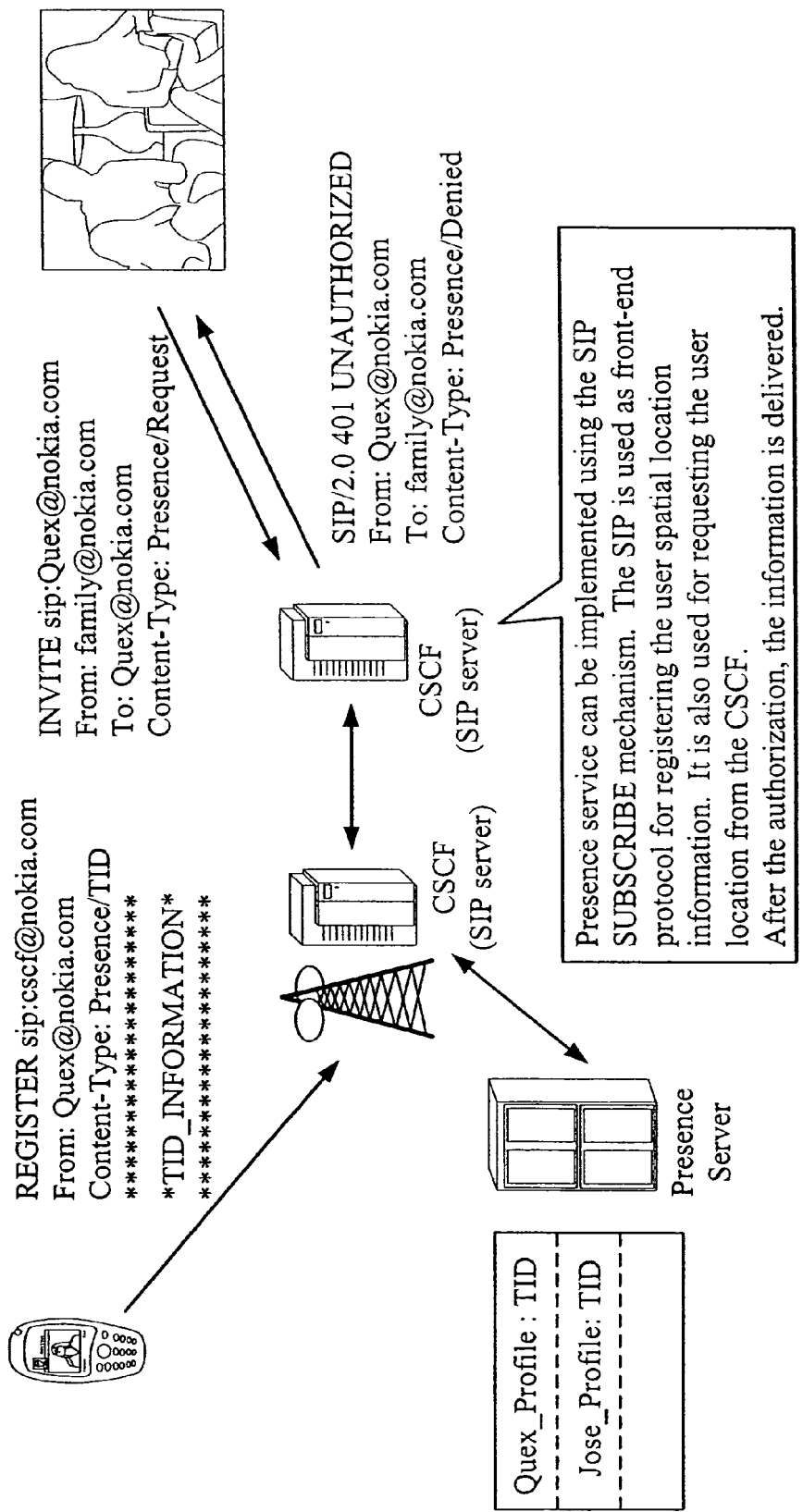
FIG. 8 shows a presence server user case, according to the present invention.

Description of the Figure:

Referring now to FIG. 8 a user registration with location data is shown: The user (Quex) registers her information in the Presence Server through the SIP CSCF. Thus, the Presence Server has complete knowledge of that user. It knows that she is logged in and her spatial information is available if it is needed for Location based Services.

The SIP UA utilizes the location data format named TID (or any other XML based format) and the Content-Type will indicate the type of format that is carried in the Payload.

The user indicates in the TID structure the level of publicity she wants to give to that information. In this case she didn't allow to other user to access that information. Thus, that data is kept hidden based on the user specifications. In case of emergency services that data is retrieved without any obstacle with the previous authorization. An example of data format for location information is presented in the Appendix 3.

After this process, the SIP will receive that information and will register the user location. At this point the SIP Registrar will need to interact with the HSS (see FIG. 9) or storing this data and make it globally available to other networks. In the next section the different entities for storing the location information in UMTS is shown.

Now, the user is registered and the system knows where she is located. If there is another user trying to find out where she is, the Presence Server or the SIP CSCF responsible will retry that information. That request is authenticated using the SIP security mechanism. The user location will be retrieved if the user gave rights to this new user to do that. It was specified during the registration using the message attributes described in Appendix 4.

User Location Information in UMTS

Figure 9:
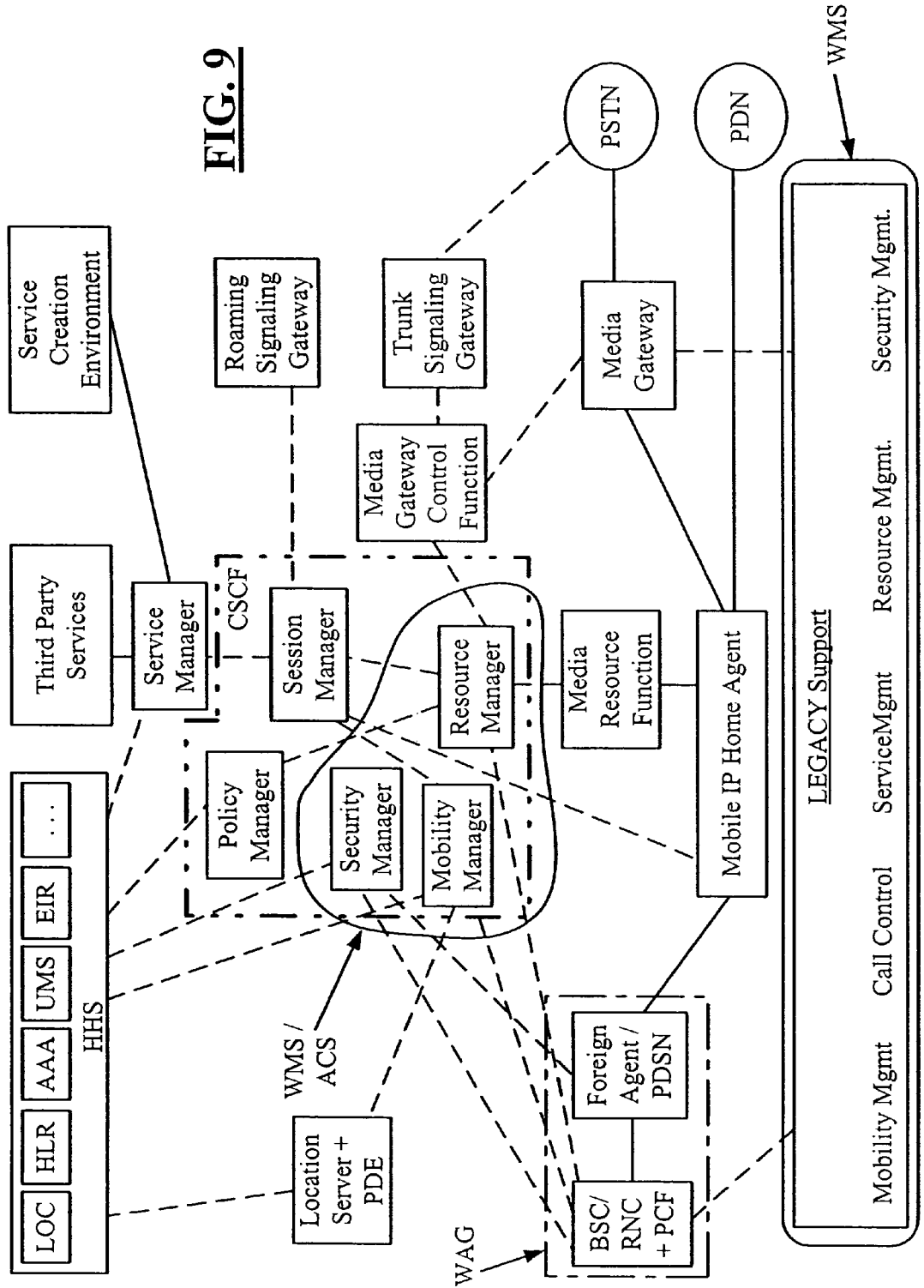
FIG. 9 shows the GPP network architecture model.
Figure 10:
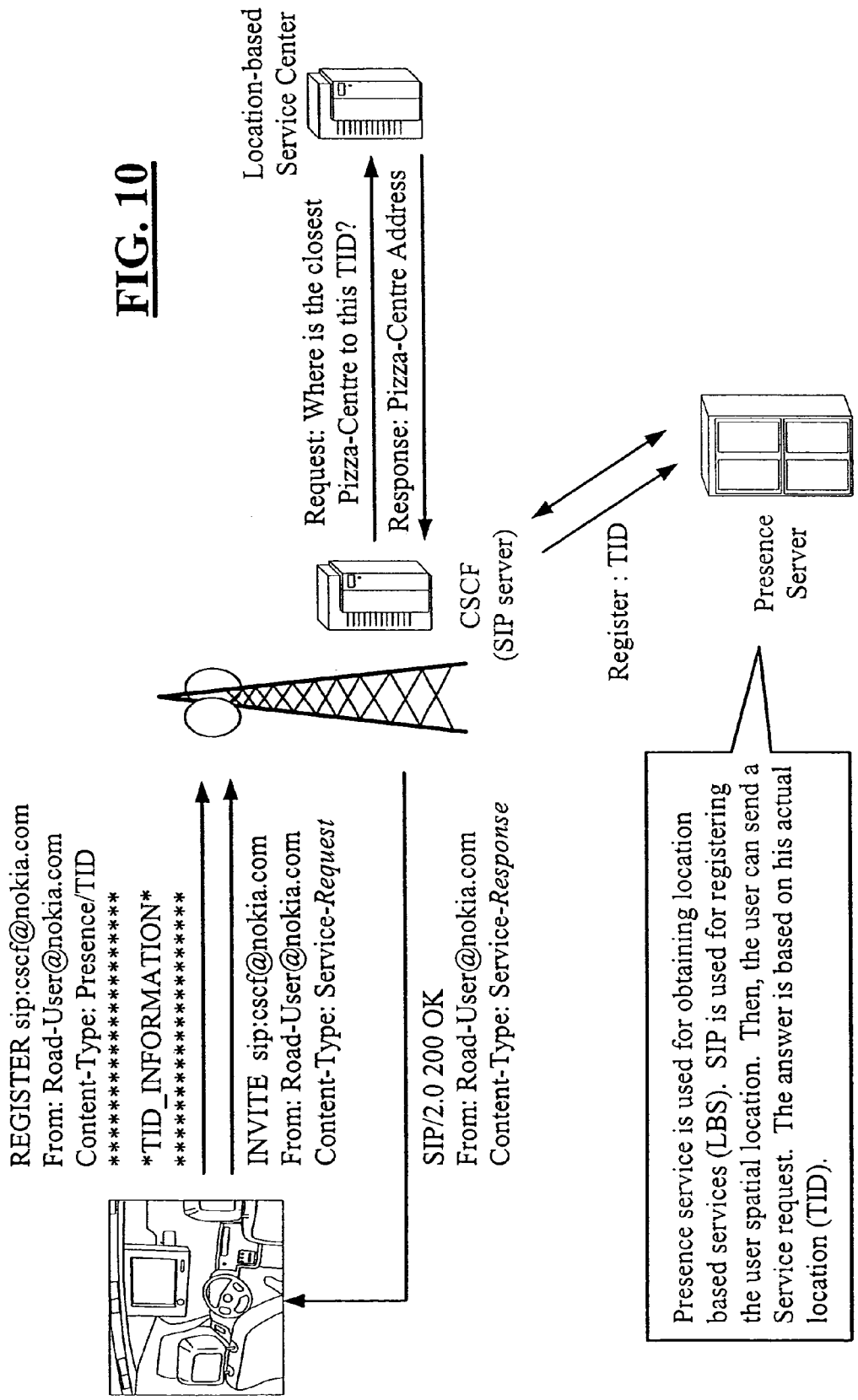
FIG. 10 shows various messages for user registration, according to the present invention.

FIG. 9 shows a GPP Network architectural model. The main entities to be considered relate particularly to mobility transactions as follows:

Mobility Manager. It undertakes Handoff Management across networks. It interacts with the Location Server and the Home Subscriber Register.

Session Manager. The SM establishes and manages Sessions, State and handoffs through and across the various networks, brings into call/session required resources such as announcements, bridging, transfers, etc. It collects Session States and end of State information and passes it to the Service Agent. It also communicates with the Resource Manager for gateway control functionality into the various media-dependent gateways. Additionally, the following functions are included: call routing, session and state management, query address translation, signaling protocol translation between legacy call control and the IP network call control protocol (e.g., ISUP) and all IP control protocol (e.g., SIP, H.323).

Roaming Signaling Gateway. The Roaming Signaling Gateway undertakes the transformation of packet signaling (SIP, MGCP, etc) into and from ISUP and TCAP signaling in the Circuit switched network. It interworks with the Session Manager. The SIG GW provides an interface between the all IP network and the legacy signaling SS7 network.

Location Server. The Location Server provides a register of Location information, Mobile Positioning Center (MPC) (GPS, Triangulization and cell/sector information). It also includes a PDE (Position Determination Equipment) interface to collect the GPS information (e.g. WAG, Foreign Agent, IP address, etc.). The LS also contains a Registration Marker to indicate if the subscriber or device is registered in one or more specifically defined Network. The Location Server updates the Location Database in the HSS.

Equipment Register. The Equipment Register is a database of equipment information, including but not limited to a record of stolen equipment. The Equipment Register is part of the Home Subscriber Server.

Home Location Register. The Home Location Register contains the subscriber profile data (usable resources/rights of interdomain services, IP priority services, SLA, etc.) which is capable of being referenced in real time, or downloaded into a cache.

From these definitions the most relevant element is the Home Subscriber Server (HSS) where user data is stored. The LS receive and retrieve information directly from the HSS. The LS is also tightly connected with the Mobility Manager, which is part of the Call State Control Function (CSCF). Thus, the CSCF will receive the registration and will retrieve it to the HSS through the LS. At the LS it can be performed some kind of translation in case of different location formats. If backward interoperability is required, it is necessary to extract the information from the TID structure and create the normal structures used at the HSS. That kind of adaptation has to be analyzed according to the different implementations.

Various Implementation Alternatives (PS)

SIP is used as the signaling for call control between CSCF for Presence and Messaging services. The SIP payload is the most suitable part of the message for transporting that information. The SIP facilitates data privacy in the sense that the whole payload can be encrypted.

The basic idea of this approach to allow backward interoperability with all the systems SIP enhanced networks. Thus, to avoid huge changes in existing implementations it is decided to define this new feature using already existing mechanisms. The SIP itself provides this feature utilizing the headers for specific purposes. That gives it a lot of flexibility. The User Agent will define his information that is inserted in the initial registration within the SIP body. In this way the packet is completely encrypted end-to-end and there is no need for any standardization effort for defining any new specific header for this purpose.

The SIP Content-Type header specifies the message body content. In this case it will indicate that is carrying Presence information using TID or any other XML based format (Example: "Content-Type: presence/TID").

There are many possibilities:

Content-Type: presence/TID. As shown in FIG. 2, the user provides the location information following the TID format (Appendix 3).

Content-Type: presence/GMLGIS. The user is using another format that follows the GIS structure.

Content-Type: presence. In this case the user is indicating that he desires to make his presence publicly available and the Server will fill his information based on his service profile. This is meant for small devices where one cannot implement a complete system for calculating the positioning (GPS) and the Sever will do it for them. The Server can use any available system (Cell-ID) to figure out the user location and fulfil the user data.

Presence Message Flow Examples

The following describes various user cases and the message flows for illustrating the Presence Service according to the present invention.

When a new call arrives to the Session Manager it will strip off the packet to check the SIP headers. In the case that it is a REGISTER message it will be notified to the Mobility Manager. The MM will check if the Content-Type is equal to "presence". In this case the MM will get the SIP packet and will check if it contains the attribute defined herein (TID, GML-GIS, or it is void). If that is the case, those values will be stored or updated in the HSS for further transactions.

For later transactions, the MM will access that information stored in the HSS if it is required for managing incoming sessions based on user profile. Otherwise, the CSCF is handling a new call set-up and the SIP packet does not contain these new attributes. Based on the SIP headers Content-type the LS will update the User Register data stored in the Home Location Register. The user profile is updated with the SDP information and stored according to the legacy networks format. The legacy networks will download directly the information required from the HLR.

FIG. 9 presents an example of call flow during a Presence service transaction. The first step is the Registration and Authentication of the SIP Terminal and the utilization of the SIP payload packet for providing User Identification Information within the Registration.

In this case we are dealing with a mobile terminal using UMTS. The user needs a small lunch break and does not have enough knowledge about the services available in the surroundings. For obtaining a service suited to his actual location he needs to resister his situation as shown. Afterwards, the user requests a specific service and he receives the response with the service adapted to his physical situation.

Referring back to FIG. 3, the SIP Terminal will encrypt the User Identity & System location for sending it in the REGISTER Request. The REGISTER request may be encrypted or not based on the user requirements. If the user does not mind that everyone knows his location the Request will be in plain text. Otherwise, the SIP contains the Authorization field (e.g. it is after a 401 Authentication Required response) and the Location Information (TID) is encrypted.

The CSCF (with SIP Proxy/Registrar capabilities) will accept the user registration. Furthermore, the CSSF sends the User Information either to the HSS (Signaling Interface Cx) or the Presence Server if such an entity.exists, as shown. After this the user is registered and his situation is available for other services. If the Presence Server does not exist, then the HSS will behave like a similar Presence Server. At this point is a matter or re-using or not overloading existing entities.

At this point the user Requests the specific service mentioned above, which in order to be fulfilled, it will be essential for the Location-based service center to have the knowledge of his location that is already available at the HSS. Thus, the user issues an INVITE for opening a session where he ask for some information. It is necessary to define an attribute to indicate the nature of this Request. Hence, at the Content-Type will be defined the attribute "Service-Request" as shown in FIG. 4.

The CSCF receives the message and checks the information of that user either in the HSS or in the Presence Server. If the user has the location information stored, the CSCF makes a query to the Location Based Services server without revealing the identity of the user that needs the information. The CSCF just make a request for a concrete service at a specific place.

The LBS server will respond with the information according only to the requirements indicated in the query by the CSCF (location-service). Thus, the user's privacy is kept secure in the CSCF.

Finally, once the CSCF receives the response from the LBS, it is forwarded to the user. The format is similar to the request but in this case the information is carried in the 200_OK response. After that the user will translate the information and give back the ACK to the CSCF that will close the session.

Instant Messaging (IM)

Embodiments of an Instant Messaging service will now be described in a few examples.

The functionality is based on the SUBSCRIBE/NOTIFY methods of SIP for sending a notification to the user when a new message arrives.

Consider a first example where a user does not want to be disturbed during a period of time but he wants to be aware of any event in case something abnormal occurs.

The advantage of this approach is that the user can be informed constantly without establishing a complete session. Again, it is emphasized that the important feature is that it does not require any new SIP method, it just uses the existing framework and defines new attributes for SIP headers.

Figure 11:
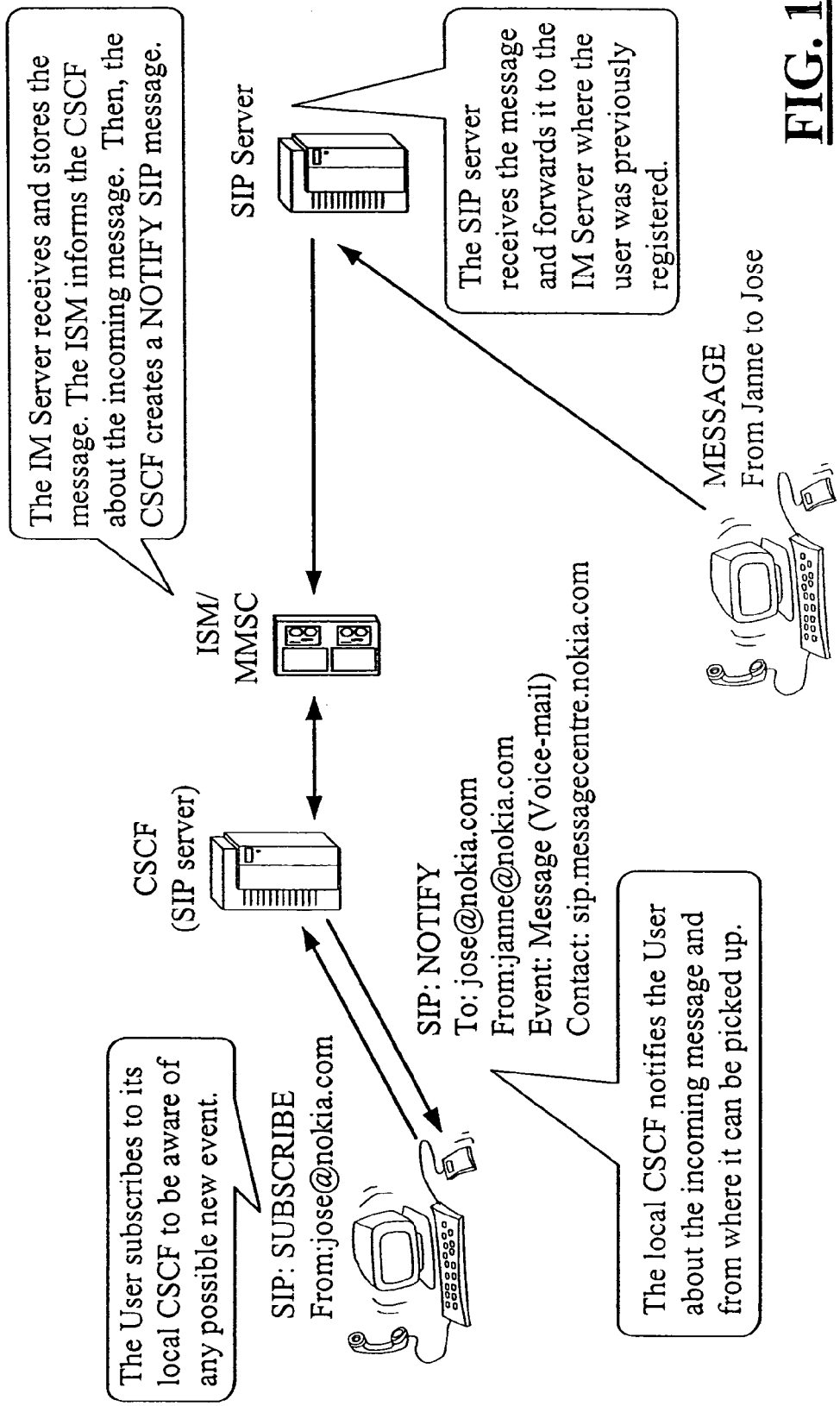
FIG. 11 shows a basic instant messaging mechanism to implement instant messaging over IP networks.

Basic IM Mechanism (See FIG. 11)

This part shows the basic mechanism used to implement the Instant Messaging Service over IP networks. In this case there are no changes between different networks. The unique inconvenience that the service has to deal with is the translation between different service providers and implementation of the similar service.

The user utilizes the SUBSCRIBE method with the CSCF to receive notifications about certain kinds of events. The type of event is indicated in the Event "header and in this case it would be "Event:Message".

Every time that the CSCF to which the user subscribed receives a message it will be notified to the user by the method NOTIFY. In the Event header is indicated the type of event and in the "Content-Type" is indicated the type of message (voice-message, SMS-text, SMS-picture, etc.)

In the case that the message is coming from another system or provider the message will be received at the CSCF that will store it in the Instant Messaging Server (IMS/MMSC). If the message is originated in another network it is necessary an intermediate step for adapting the message format. From the user point of view such is hidden and it only will SUBSCRIBE to some specific "Event" and will receive the "NOTIFY" when it occurs.

Finally the user receives a notification about a new message. In the From header of the SIP is indicated the origin of that message. In the Contact is indicated the point where that message can be picked up (it can be either the Messaging Server address or the URL where the information is stored). In the Content-type would be indicated the nature of the message, if it is voice-message, picture, video-clip, etc.

Internetworking IM

This part shows roughly the situation where the message or information is coming from another type of network. In such a case, as mentioned above, it is necessary to perform a format or even signaling translation. At this point the Signaling gateway for PTSN or the Roaming-Signaling gateway, in case of GSM, or mobile networks becomes important.

Figure 12:
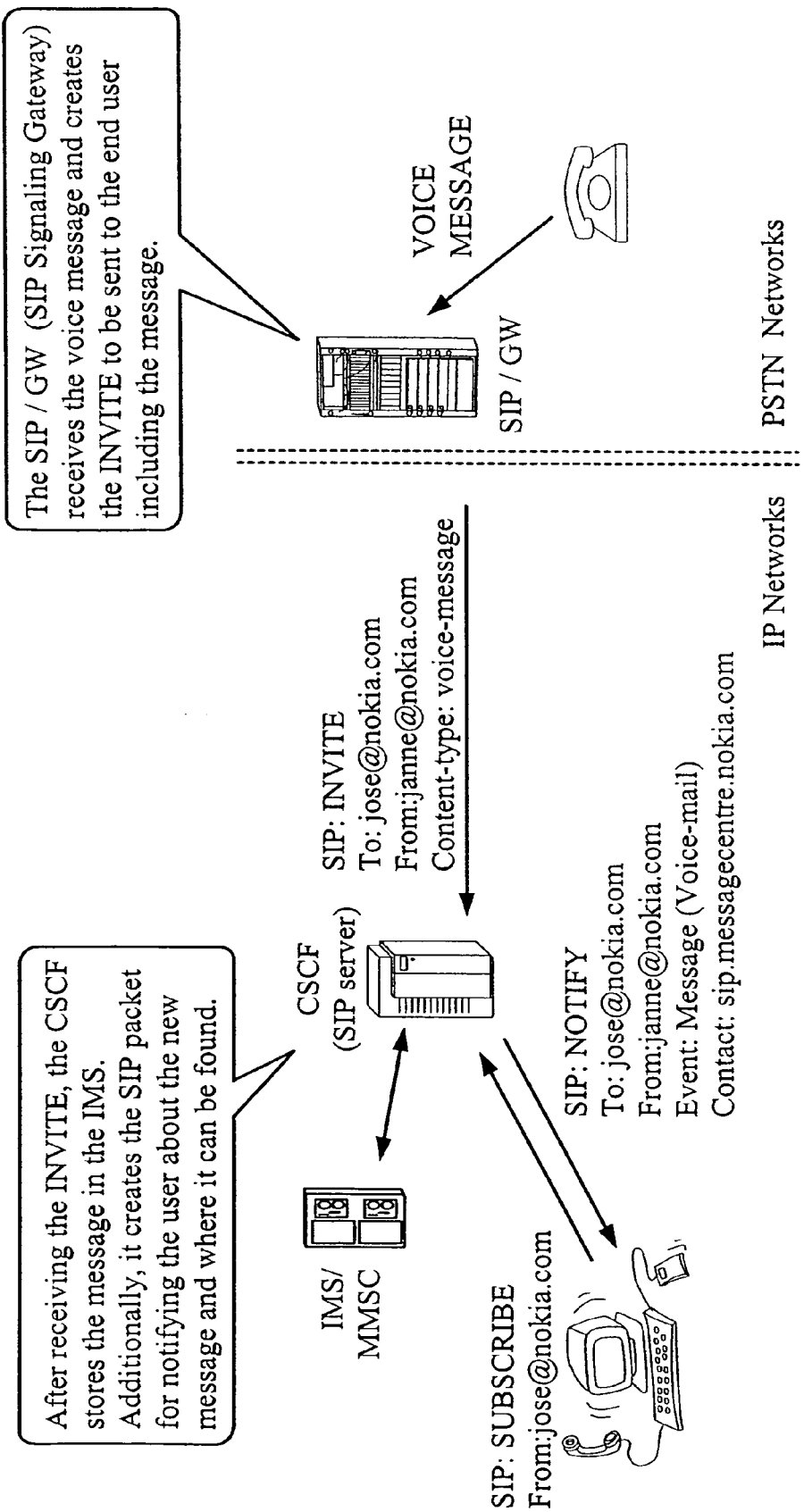
FIG. 12 shows interworking for instant messaging, according to the present invention.

The first example is shown in FIG. 12 and illustrates a call coming from the PSTN network.

The first step is the user subscription in order to be made aware of any happening but without being disturbed.

The phone call is going through the Gateway (SIP/GW). The GW convert the normal voice call in an SIP INVITE message and it goes through the network till it reaches the CSCF where the end user was registered.

The CSCF receives the normal SIP call and based on the user's requirements it doesn't continue the normal call continuation. Instead, it converts the incoming information into a voice-message.

The CSCF stores the message at the Messaging Server.

Finally the CSCF will send a NOTIFY message to the user with the characteristics of the event that it received and was addressed to him. The message will indicate the "Content-Type voice-message" and where it can be picked up in the "Contact sip.messagecentre.nokia.com."

Figure 13:
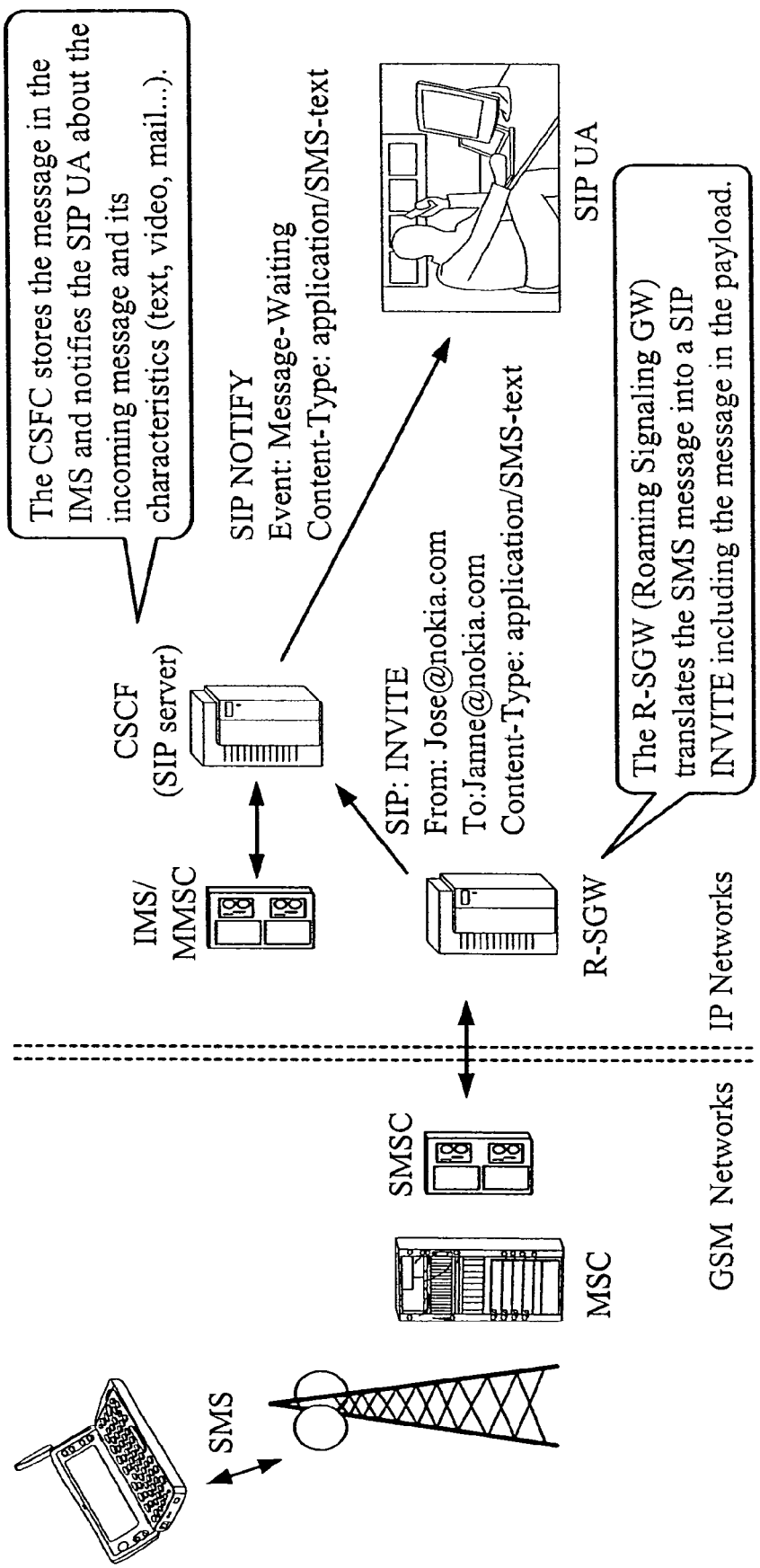
FIG. 13 shows another example of interworking instant messaging, according to the present invention.

FIG. 13 is similar with the difference that the origin is a well-known Short Message Service (SMS) from GSM networks. In this case it will need a Roaming Signaling GW (see also FIG. 9) for converting the message into an SIP transaction. The R-SGW will find out where the user is located and will send the normal SIP INVITE with the message information toward that user. From there the procedure is similar to the previous case.

User is Subscribed.

The message is originated at the GSM network The message reaches the SMS center and from there to the Roaming Signaling GW where it is converted to an SIP transaction. At this point there are two possibilities. The message is inserted in the body of an SIP INVITE and its nature is indicated in the Content-type. Otherwise, the SMS is directly matched with the already defined SIP MESSAGE method.

From there, the SIP message is addressed to the CSCF where the user is registered.

Now the procedure is similar to the previous cases. The message is stored at the messaging center and it is notified to the user as shown in FIG. 13.

Figure 14:
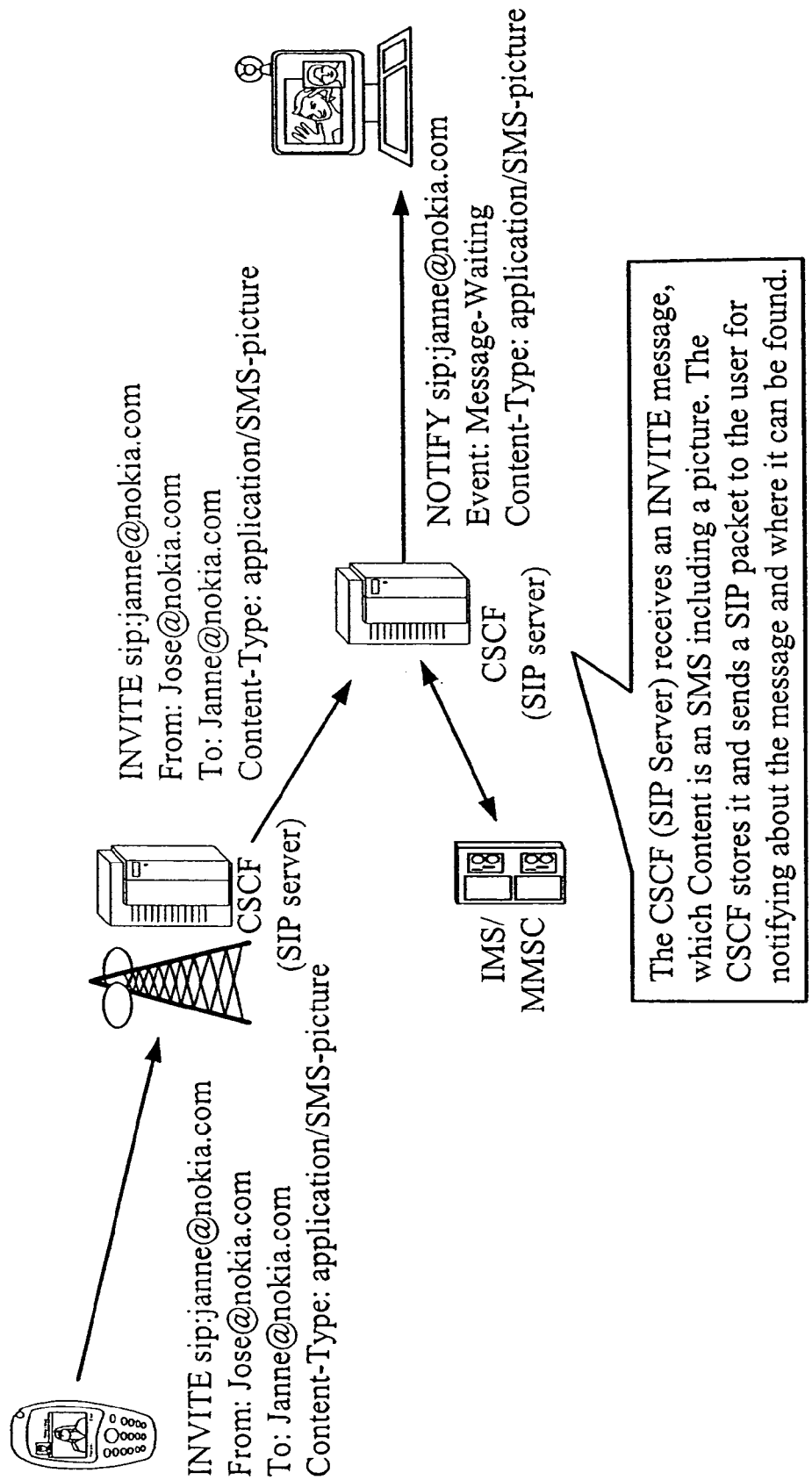
FIG. 14 shows an example of instant messaging over all-IP networks where there is no need for conversions.

The last IM example is shown in FIG. 14 where an All-IP network transaction is shown. I.e., there is no need for conversions. The Signaling is SIP based throughout and the call goes through the SIP enhanced networks without changes.

Presence and Messaging

In this part a couple of examples are shown where both presence and messaging services as implemented for providing a complete service. The Presence Server checks the user requirements and acts based on that. It saves network resources according to the user profile specification.

Figure 15:
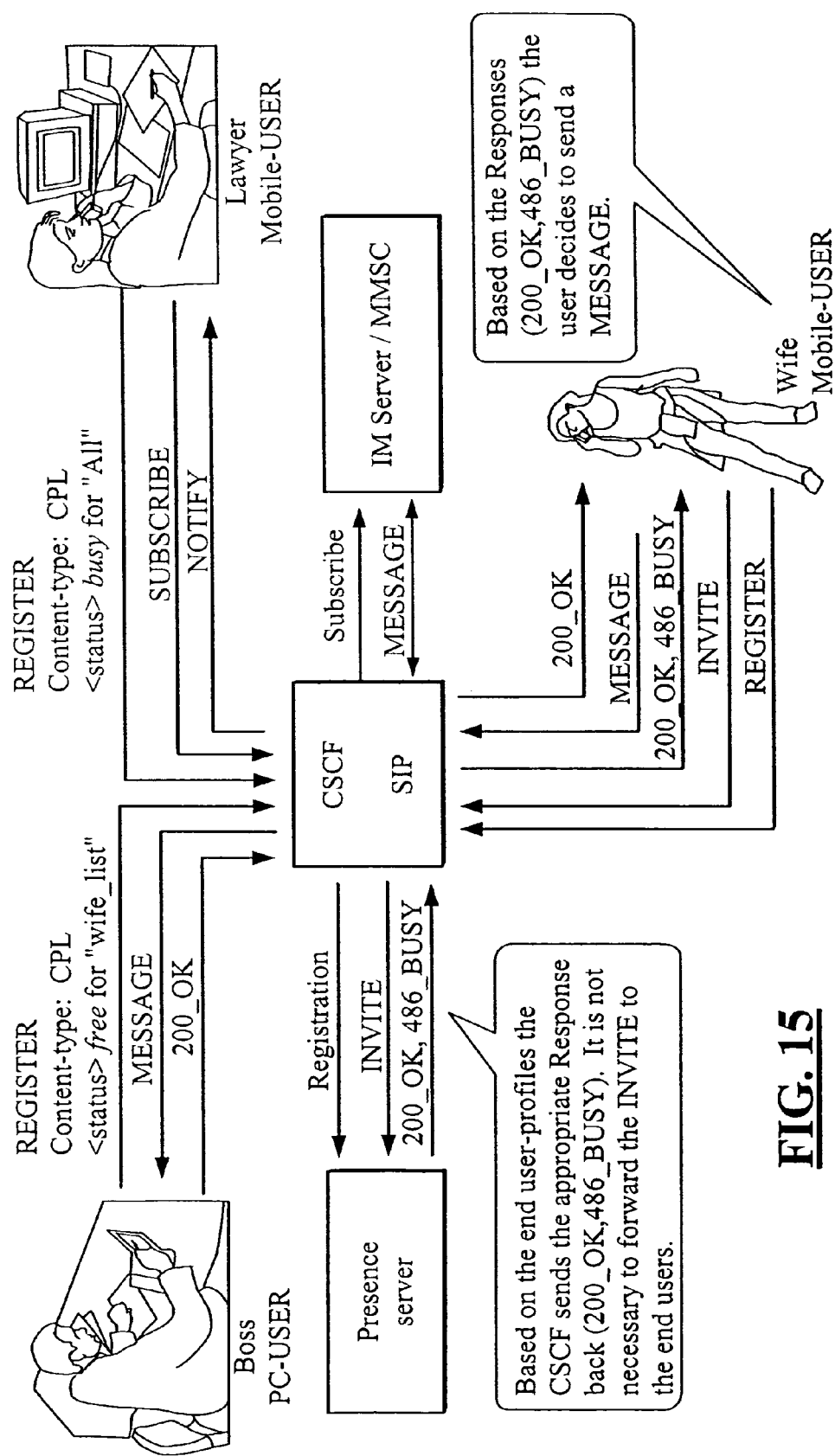
FIG. 15 shows an example of presence and messaging used in conjunction with each other.

Example 1 (See FIG. 15)

Initially all the users (Boss, Lawyer, Wife) are subscribed providing their information, including service requirements. Some of the are free and others are busy but want to be aware of any happening. Thus at this point the users' information is stored at the Presence Server.

One of the users is busy (Lawyer) and does not want to be disturbed. Instead, she will subscribe to the Messaging server to receive notifications anyway.

The Subscription is Achieved at the Messaging Server.

The third user (Wife) wants to establish a transaction with two people (Boss, Lawyer) at the same time. She initiates a SIP session with both of them.

The SIP INVITE request arrives to the CSCF but instead of being forwarded the CSCF first starts to search for information about the end users. The CSCF requests the presence Server for any clue about the invited users.

The CSCF based on the response from the Presence Server finds out that one of the users is available (Boss) and the other is busy (Lawyer).

At this point the CSCF returns to the originating user (wife) a Response indicating the status of each of them. This mechanism is different from the normal transaction where the INVITE would be forwarded without any checking.

The user (Wife) who initiated the previous session based on the feedback response from the CSCF decides to send a message to both end users instead of establishing a direct call.

The message arrives to the CSCF and it checks the user profiles regarding their preferences. It once again checks and realizes that one of them does not want to be disturbed.

The message is directly forwarded to the user (Boss) that specified during the registration that he was free.

The message is stored for the third user (Lawyer) who is busy. Instead she will receive a notification that the message is waiting to be picked up.

Conclusion:

With the combination of both mechanisms can be provided a more complete service to the user and it will save some network resources in some aspects.

Figure 16:
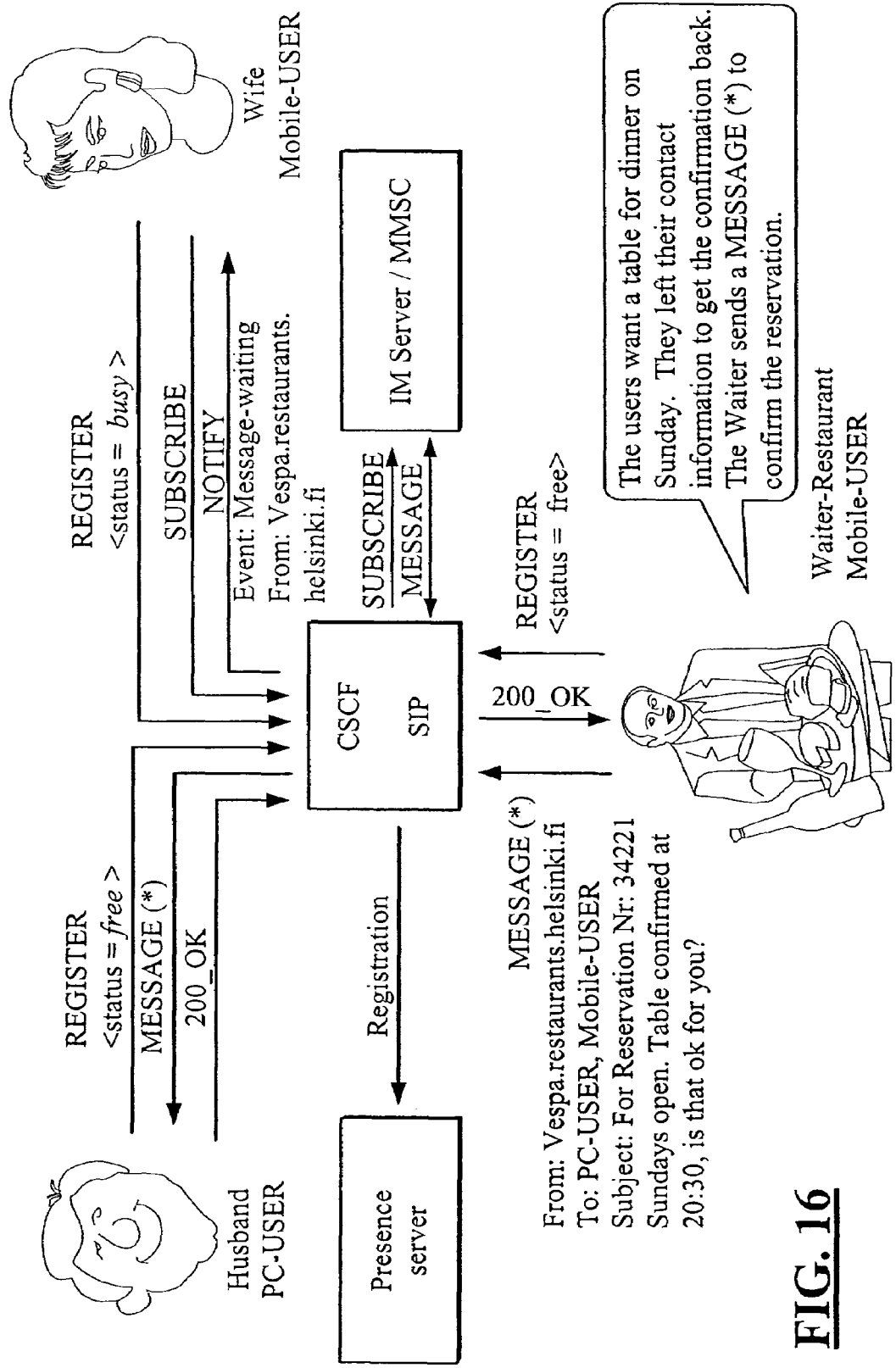
FIG. 16 shows another example of presence and instant messaging used together.

Example 2 (See FIG. 16)

This example uses a similar combination of both Presence and Messaging systems for defining an innovative service.

The illustrated users (Husband, Wife) tried to make a reservation for having dinner in a Restaurant but it was fully booked. They left their contact information in case of any cancellation. Following is the message flow for implementing such a service:

The users make a registration with their information to the Presence Server. From then on all this data is available to be requested by the CSCF.

One of the users (Wife) is busy but she decides to subscribe for notification of any message because she had a good intuition.

The wife's subscription is registered at the Messaging Server.

Suddenly, one table is cancelled. The waiter checks the list of reservations in the computer and automatically (on click) sends a message to the people according to the order listed in the computer.

The CSCF connected to the Restaurant PC receives the request and check the user's status in the messaging server.

Based on the information from the MS the message is directly forwarded to one of the users (Husband).

The other user (Wife) is busy but she will receive a notification of the message. The notification will include sufficient information (in Subject header) to know if the message is important or not to be pulled out from the messaging center.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

APPENDIXES

Appendixes abbreviations

| | |
|---|---|
| API | Application Programming Interface |
| AuF | Authentication Function |
| BCC | Basic Call Control |
| BCSM | Basic Call State Model |
| BHCA | Busy Hour Call Attempt |
| CC | Call Control |
| CPS | Call Processing Server |
| CS | Circuit Switched |

-continued

| | |
|---|---|
| CSCF | Call State Control Function |
| E-GGSN | Enhanced Gateway GPRS Support Node |
| E-SGSN | Enhanced Serving GPRS Support Node |
| ETSI | European Telecommunications Standards Institute |
| FFS | For Further Study |
| GK | Gatekeeper |
| GGSN | Gateway GPRS Support Node |
| GPRS | General Packet Radio Service |
| GSM | Global System for Mobile telecommunications |
| GW | Gateway |
| HLF | Home Location Function |
| HLR | Home Location Register |
| HPoA | H.323 Point of Attachment |
| HSS | Home Subscriber Server |
| HTML | Hypertext Markup Language |
| HTTP | Hypertext Transfer Protocol |
| IANA | Internet Assigned Numbers Authority |
| I-CSCF | Interrogating Call State Control Function |
| IETF | Internet Engineering Task Force |
| IMSI | International Mobile Subscriber Identity |
| IP | Internet Protocol |
| IPTE | IP Terminal |
| ITU | International Telecommunications Union |
| IWF | Interworking Function |
| LAN | Local Area Network |
| LCS | Location Service |
| Mbone | Multicast Backbone |
| MD5 | Message Digest algorithm ver. 5 |
| MGCF | Media Gateway Control Function |
| MGW | Media Gateway |
| MRF | Media Resource Function |
| MT | Mobile Terminal |
| NNI | Network to Network Interface |
| NpoA | Network Point of Attachment |
| O-CSCF | Originating Call State Control Function |
| PDP | Packet Data Protocol |
| PDU | Protocol Data Unit |
| PPP | Point-to-Point Protocol |
| PLMN | Public Land Mobile Network |
| PSTN | Public Switched Telephone Network |
| PTP | Point To Point |
| QoS | Quality of Service |
| RAN | Radio Access Network |
| RN | Roaming Number |
| R-SGW | Roaming Signaling Gateway |
| RSVP | Resource Reservation Protocol |
| RTCP | Real-Time Control Protocol |
| RTP | Real-Time Protocol |
| RTSP | Real-Time Streaming Protocol |
| RTT | Round-Trip Time |
| SAP | Session Announcement Protocol |
| SCN | Switched Circuit Network |
| SCP | Session Control Protocol |
| SCTP | Stream Control Transmission Protocol |
| S-CSCF | Serving Call State Control Function |
| SDP | Session Description Protocol |
| SGSN | Serving GPRS Support Node |
| SIP | Session Initiation Protocol |
| SloP | Spatial Location Payload |
| SPD | Serving Profile Database |
| SS7 | Signalling System 7 |
| TA | Transport Address (IP address + TCP/UDP port number) |
| TCP | Transport Control Protocol |
| TE | Terminal Equipment |
| TID | Target record Accessing ID |
| TAD | Target record Accessing ID |
| T-SGW | Transport Signalling Gateway |
| UA | User Agent |
| UAC | User agent Client |
| UAS | User Agent Server |
| UDP | User Datagram Protocol |
| UMS | User Mobility Server |
| UMTS | Universal Mobile Telecommunications System |
| UNI | User to Network Interface |
| URL | Universal Resource Locator |
| VLF | Visitor Location Function |
| VoIP | Voice over IP |

Appendix 2

Terms

User: A person or other entity authorized by a subscriber to use some or all of the services subscribed to by that subscriber.

User Identity: a code or string of a particular prescribed format uniquely identifying a user across a multi-user, multi-service infrastructure.

User Service Role: role that a user has in the scope of a particular service.

User Service Role Identity: a code or string of a particular prescribed format uniquely identifying a user service role instance.

Handover: it is further called seamless when the terminal location change does not result in delay or loss of communicated data that would ultimately be perceived by the user as degradation of quality of service. The seamless handovers thus may depend on many factors, including service type and service presentation robustness against data loss at the terminal.

H.323 Mobile Terminal: a Mobile Terminal that implements the H.323 Terminal functions as defined in the H.323 standard.

H.323 Point of Attachment: the gatekeeper with which the H.323 terminal is registered. Mobile Terminal: a Terminal that may change its Network Point of Attachment and/or H.323 Point of Attachment.

Network Point of Attachment: the address by which packets reach an endpoint.

Services: Different types of services exist, one can distinguish:

Provided at the application layer towards subscribers, hence called applications; the type of services usually referred to within the scope of the mobility problem. Provided by a lower communication protocol layer towards an upper protocol layer by means of a defined Service Access Point (SAP), typically some type of transport service.

Service Mobility: ability for a user to use the particular (subscribed) service irrespective of the location of the user and the terminal that is used for that purpose.

Subscriber: A person or other entity that has a contractual relationship with a service provider on behalf of one or more users. (A subscriber is responsible for the payment of charges due to that service provider.)

Service Provider Mobility: the ability of a user to change services providers and retains the same user identity.

User Terminal Profile: user-specific information, possibly contained in a multi-user database, indicating which terminals a user is using, both on a temporary or permanent basis.

Terminal Identity: a code or string of a particular prescribed format uniquely identifying a terminal.

Terminal Mobility: the ability for a terminal to change location, network point of attachment, and H.323 point of attachment and still be able to communicate. Discrete terminal mobility (terminal roaming): The ability for a terminal to make discrete changes of location. I.e., to change location while no media streams are active. Continuous terminal mobility (handover): The ability for a terminal to change location while media streams are active.

User Mobility: defined as the ability for a user to maintain the same user identity irrespective of terminals and terminal types, and so network point of attachment.

User Service Profile: user-specific information, possibly contained in a multi-user database, indicating which services a to which a user is subscribed and personal configuration data for the respective services. Note that particular services may use the user terminal profile as input for service operation.

Mobility Management: the set of functionalities needed to provide User, Terminal and Service Mobility.

Home Administrative Domain: the Administrative Domain that is related by subscription to the mobile H.323 network user. The Home Administrative Domain permanently contains user specific data including location, authentication, and service profile information related to the mobile H.323 network User.

Visited Administrative Domain: the Administrative Domain that is not the Home Administrative Domain and is serving an active mobile H.323 network User.

Serving Administrative Domain: the (Visited or Home) Administrative Domain that is serving an active mobile H.323 network User.

TID: Target information ID. This is a URL based identifier that contains all the location information of any user. It is fixed at the subscription point.

TAD: Target record Accessing ID. This is a URL that links the momentary location of the user to his fixed record. (TID)

SLoP: Spatial Location Payload. Is the definition of the message format where is stored the location information. It is mainly based on TID or TAD depending if the user is situated at his usual point of attachment or he is in a temporal location.

Appendix 3

TID and TAD Overview:

In order to obtain the spatial location of a target, there must be a method to identify and refer to the target. Two identifiers to a target are as follows: (1) Target information ID (TID) and (2) Target record Accessing iD (TAD).

The TID serves as a persistent, location-independent, resource identifier, even valid after the existence of the target. On the other hand, TAD is generally made of contact information, handling procedure(s), etc., for the repository of the target's location information. TAD can only tell you where/how to get the location information of a given target. There can be more than one TAD for a given TID. It can be time/place dependent, non-persistent, etc.

For example, the TID of Mike Lee can include information, such as "Name: Mike Lee, Sex: Male, Nationality: xyz, ID: 221166-3355, etc.". The TAD of Mike Lee can include information, such as "Identity: a subset of TID (e.g., his name and ID number), Accessing: the contact procedure and address of his social registration office or the repository having his location information, etc."

A Uniform Resource Identifier (URI) is a compact string of characters for identifying an abstract or physical resource. It is a very suitable identifier for the targets described herein (Sec 2). There are several well-known subsets of URI, such as, Uniform Resource Name (URN), Uniform Resource Locator (URL), etc.

As a subset of URI, URN is a resource identifier with the specific requirements for enabling location independent identification of a resource, as well as longevity of reference. A TID can be very well named with a URN. For example, the URN based TID of Mike Lee's car can be:

"urn:namespace-xyz:car=abc-888, registration-state=nnn, owner=mike.lee, nationality=xyz, id=221161-3355, email=mike.lee@hardcom.com, pstn=+358405021988".

The URN based TID of Mike Lee's car can be kept at the car's original registration repository at state nnn. The URI based TADs of Mike Lee's car can be dependent on where the car is located currently. For example, (1) when the car is currently not in the country xyz, its TAD can be: "slop:car=abc-888, registration-state=nn=car1.find.gov:5888; valid-till=31.8.2000", (2) when the car is currently in the country xyz, its (default) TAD can be: "slop:abc-888@vehicle.monitoring.eu:transport-tcp:2008", where, "slop" is the protocol or scheme for accessing the location information.

Appendix 4

Attributes of the Data Format to be Considered:

The format of the messages has to be defined according to the location needs. The important part of the message corresponds to the location information, which can be defined in different ways depending of the device. The main fields could contain the following data:

Co-ordinates: It indicates the geographical location of the user. It can be GPS data or any other format depending on later design.

Accuracy: To indicate how accurate is the information.

Time-To-Live: It is the period of time that the information in the message is valid.

Device-Type: To know what kind of device is providing the information and if it is capable of providing additional information if it is necessary. It can be defined as a mobile, fixed phone, IP device or a simple survival mechanism providing GPS data.

Device-Static: It defines how static the device is on a scale from 0 to 10, i.e., it can be totally fixed to moving with high velocity. This field is mainly used to determine the latency period between updates. A device with this field equal to 0 indicates that is fixed and it only needs to be updated after long period of time or even it does not need to be updated, it just lets the Time to live expire.

Device-Status: To indicate in which state the device actually is. It can be fixed, moving, changing LA scope and other possible states.

Info-Transparency: It indicates the grade of privacy for the information contained in the message. It can have a scale from 0 to 10 depending whether the user wants to make his information totally transparent to other users (10) or totally opaque (0). In that case the LA will receive that information but it cannot replicate the data regarding to the location of that user (except for emergency services).

What is claimed is:

1. Method, comprising:
   receiving an application layer signaling message from a user registering for a presence service provided over an Internet protocol network,
   checking said message for extracting spatial location information of said user,
   storing said extracted spatial location information of said user,
   providing access to said spatial location information of said user to one or more location based services,
   wherein said spatial information is contained in said message as a spatial location payload according to a session initiation protocol, said presence service is provided to said user according to said spatial location information of said user,
   and wherein said access to said spatial location information of said user is provided to said one or more location based services without providing access to associated user identity information.

2. The method of claim 1,
   wherein said spatial location information of said user is provided to one or more other users in conjunction with a messaging service provided to said other users.

3. Method, comprising:
   constructing an application layer signaling message containing spatial location information of a user, said spatial information being contained in said message as a spatial location payload according to a session initiation protocol,
   providing said application layer signaling message for registering said user with a presence service over an Internet protocol network,
   wherein said spatial location information of said user is extracted by a presence server in providing said presence service to said user according to said spatial location information,
   and wherein access to said spatial location information of said user is provided to one or more location based services without providing access to associated user identity information.

4. The method of claim 3, wherein said one or more location based service is provided to said user according to said spatial location information of said user.

5. The method of claim 3, wherein said providing said application layer signaling message includes providing security for said spatial location information by encryption.

6. The method of claim 3, wherein said providing said application layer signaling message includes providing security for said spatial location information by including security information for use by said presence service in handling said spatial location information.

7. The method of claim 3, wherein said spatial location information is provided to one or more other users in conjunction with a messaging service provided to said other users.

8. A network system in communication with a terminal device,
   a server, configured to receive an application layer signaling message from the terminal device registering a user of said device for a presence service provided over an Internet protocol network, to check said message for extracting spatial location information of said user, and to provide access to said spatial location information of said user to one or more location based services, and
   a data storage configured to store said extracted spatial location information of said user,
   wherein said spatial information is contained in said message as a spatial location payload according to a session initiation protocol, said presence service is provided to said user according to said spatial location information of said user,
   and wherein access to said spatial location information of said user is provided to said one or more location based services without providing access to associated user identity information.

9. The network system of claim 8, wherein said network system is configured to provide spatial location information of said user to one or more other users in conjunction with a messaging service provided to said other users.

10. An apparatus in communication with a network system, comprising:
    a processor, configured to construct an application layer signaling message containing spatial location information of a user, said spatial information being contained in said message as a spatial location payload according to a session initiation protocol,
    a communication interface, configured to provide said application layer signaling message to the network system for registering said user with a presence service provided over an Internet protocol network,
    wherein said spatial location information of said user is extracted by the network system in providing said presence service to said user according to said spatial location information,
    and wherein access to said spatial location information of said user is provided to one or more location based services without providing access to associated user identity information.

11. The apparatus of claim 10, wherein said apparatus is configured to receive one or more location based service provided to said user according to said spatial location information of said user.

12. The apparatus of claim 10, wherein said spatial location information contained in said application layer signaling message is secured by encryption.

13. The apparatus of claim 10, wherein said spatial location information contained in said application layer signaling message is secured by including information for use by said presence service in handling said spatial location information.

* * * * *